US012657064B2

(12) United States Patent
Shen et al.

(10) Patent No.: US 12,657,064 B2
(45) Date of Patent: Jun. 16, 2026

(54) METHOD OF CREATING CONTAINER, ELECTRONIC DEVICE AND STORAGE MEDIUM

(71) Applicants: Beijing JingDong ShangKe Information Technology Co., Ltd., Beijing (CN); Beijing Jingdong Century Trading Co., Ltd., Beijing (CN)

(72) Inventors: Bowei Shen, Beijing (CN); Shi Bai, Beijing (CN)

(73) Assignees: Beijing JingDong ShangKe Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 552 days.

(21) Appl. No.: 18/041,689

(22) PCT Filed: Aug. 30, 2021

(86) PCT No.: PCT/CN2021/115374
§ 371 (c)(1),
(2) Date: Feb. 14, 2023

(87) PCT Pub. No.: WO2022/042724
PCT Pub. Date: Mar. 3, 2022

(65) Prior Publication Data
US 2023/0315531 A1     Oct. 5, 2023

(30) Foreign Application Priority Data
Aug. 31, 2020     (CN) .......................... 202010900719.6

(51) Int. Cl.
*G06F 9/50*         (2006.01)

(52) U.S. Cl.
CPC .......... *G06F 9/5044* (2013.01); *G06F 9/5077* (2013.01); *G06F 2209/5021* (2013.01)

(58) Field of Classification Search
CPC ................ G06F 9/5044; G06F 9/5077; G06F 2209/5021; G06F 15/177; G06F 9/455;
(Continued)

(56) References Cited

U.S. PATENT DOCUMENTS 9,874,924 B1 *   1/2018  Li .......................... G06F 9/5088
11,782,769 B2   10/2023  Tian et al.
(Continued)

FOREIGN PATENT DOCUMENTS

CN          105991478          10/2016
CN          108512890          9/2018
(Continued)

OTHER PUBLICATIONS

First Chinese Office Action, issued in the corresponding Chinese patent application No. 202010900719.6, dated Nov. 28, 2024, 14 pages with the machine translation.
(Continued)

*Primary Examiner* — Aimee Li
*Assistant Examiner* — Hsing Chun Lin
(74) *Attorney, Agent, or Firm* — HSML P.C.

(57)          ABSTRACT

A method and an apparatus of creating a container, an electronic device, and a storage medium. The method includes: acquiring an available rack list and an available network address list, the available rack list including a plurality of available racks of different available zones, each available rack including at least one server node, the available network address list including at least one available network address; locating a spare server node in the available racks in the available rack list; creating, on the spare server node, a current container corresponding to the avail-
(Continued)

able network address; updating the available network address list; re-ordering the available racks in the available rack list according to resource occupation information of the available racks in the available rack list; and creating another container according to a spare server node in the re-ordered available racks in the available rack list and the updated available network address list.

17 Claims, 10 Drawing Sheets

(58) Field of Classification Search
    CPC ....... G06F 9/45558; G06F 2009/45562; G06F 2009/4557
    See application file for complete search history.

(56) References Cited

U.S. PATENT DOCUMENTS

| | | | | |
|---|---|---|---|---|
| 2017/0257424 | A1 | 9/2017 | Neogi et al. | |
| 2017/0279672 | A1* | 9/2017 | Krishnan | H04L 41/0803 |
| 2018/0203736 | A1* | 7/2018 | Vyas | G06F 9/45558 |
| 2018/0276031 | A1 | 9/2018 | Zhou et al. | |
| 2019/0196846 | A1 | 6/2019 | Guo et al. | |
| 2020/0396181 | A1* | 12/2020 | Lochhead | G06F 3/04842 |
| 2021/0034436 | A1 | 2/2021 | Tian et al. | |

FOREIGN PATENT DOCUMENTS

| | | |
|---|---|---|
| CN | 109885377 | 6/2019 |
| CN | 110278288 | 9/2019 |
| CN | 110515693 | 11/2019 |
| CN | 110825494 | 2/2020 |
| CN | 110888714 | 3/2020 |
| JP | 2019-117485 | 7/2019 |
| JP | 2021-521520 | 8/2021 |
| WO | 2019/196701 | 10/2019 |

OTHER PUBLICATIONS

Extended European Search Report, issued in the corresponding European Patent application No. 21860556.6, dated Jul. 17, 2024, 9 pages.

International Search Report and Written Opinion, issued in the corresponding PCT Application No. PCT/CN2021/115374, dated Nov. 255 2021, 9 pages.

Japanese Office Action, issued in the corresponding Japanese Patent application No. 2023-511608, dated Feb. 27, 2024, 15 pages.

Third Office Action, issued in the corresponding Chinese patent application No. 202010900719.6, dated Nov. 25, 2025, 18 pages with the machine translation.

* cited by examiner

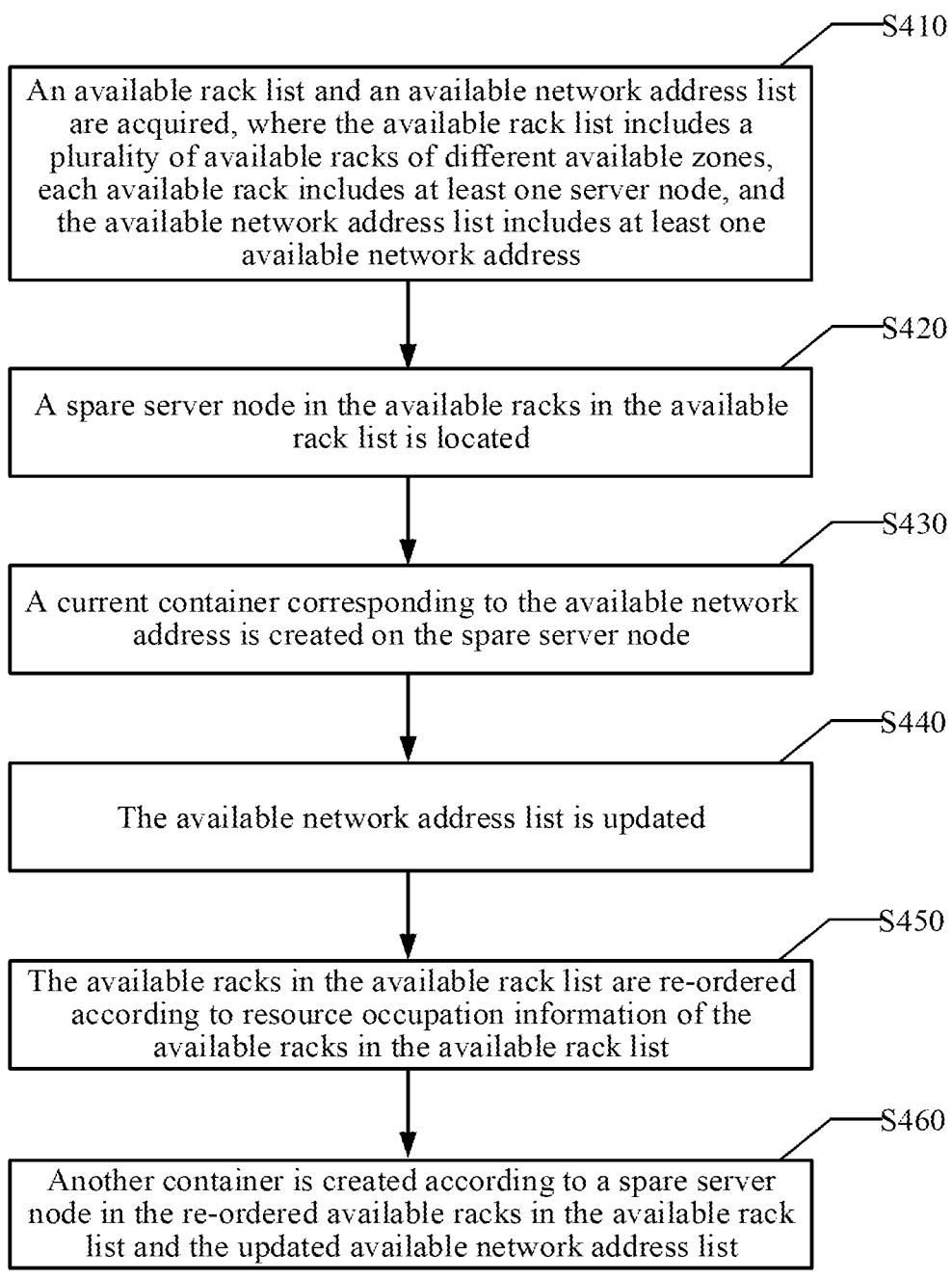

An available rack list and an available network address list are acquired, where the available rack list includes a plurality of available racks of different available zones, each available rack includes at least one server node, and the available network address list includes at least one available network address

— S410

A spare server node in the available racks in the available rack list is located

— S420

A current container corresponding to the available network address is created on the spare server node

— S430

The available network address list is updated

— S440

The available racks in the available rack list are re-ordered according to resource occupation information of the available racks in the available rack list

— S450

Another container is created according to a spare server node in the re-ordered available racks in the available rack list and the updated available network address list

METHOD OF CREATING CONTAINER, ELECTRONIC DEVICE AND STORAGE MEDIUM

CROSS REFERENCE TO RELATED APPLICATION(S)

This application is a Section 371 National Stage Application of International Application No. PCT/CN2021/115374, filed on Aug. 30, 2021, which claims priority to Chinese Patent Application No. 202010900719.6 entitled "METHOD AND APPARATUS OF CREATING CONTAINER, ELECTRONIC DEVICE AND STORAGE MEDIUM" filed on Aug. 31, 2020, the contents of which are incorporated herein by reference in their entirety.

TECHNICAL FIELD

The present disclosure relates to a field of a computer technology and in particular, to a method of creating a container, an electronic device, and a storage medium.

BACKGROUND

With a continuous growth of products in a private cloud platform, various product services and containers in the platform are getting more and more. If all containers are manually maintained by operation and maintenance personnel, a lot of personnel consumption and uncertainties may be undoubtedly brought, which may lead to an increase in an operation and maintenance cost and a failure rate.

In order to solve the above-mentioned problems, various container cluster management platforms are emerging. The container cluster management platform may provide a series of functions such as a container orchestration, a resource scheduling, an elastic scaling, a deployment management, a service discovery, etc. The container cluster management platform may be, for example, Kubemates (K8s for short).

SUMMARY

An aspect of the present disclosure provides a method of creating a container, and the method includes: acquiring an available rack list and an available network address list, wherein the available rack list includes a plurality of available racks of different available zones, each available rack includes at least one server node, and the available network address list includes at least one available network address; locating a spare server node in the available racks in the available rack list; creating, on the spare server node, a current container corresponding to the available network address; updating the available network address list; re-ordering the available racks in the available rack list according to resource occupation information of the available racks in the available rack list; and creating another container according to a spare server node in the re-ordered available racks in the available rack list and the updated available network address list.

According to embodiments of the present disclosure, the acquiring an available rack list includes: acquiring a total resource of each server node in each rack; acquiring a used resource of each server node, wherein the used resource is a resource used by a created container; determining the available racks according to the total resource of each server node and the used resource of each server node; and generating the available rack list according to the available racks.

According to embodiments of the present disclosure, the plurality of available racks in the available rack list are sorted according to a priority level.

According to embodiments of the present disclosure, the plurality of available racks in the available rack list are sorted according to a priority level by: acquiring a created container list, wherein the created container list includes a plurality of created containers, and each created container has a corresponding server node, an application to which the created container belongs, and a group to which the created container belongs; determining a creation quantity information corresponding to each server node, wherein the creation quantity information includes a number of created containers belonging to a same application and a number of created containers belonging to a same grow; and prioritizing the plurality of available racks in the available rack list according to the creation quantity information corresponding to each server node.

According to embodiments of the present disclosure, the locating a spare server node in the available racks in the available rack list includes: determining an available rack having a highest priority level in the available rack list as a current rack; determining whether a number of spare server nodes in the current rack is greater than a preset threshold value or not; locating, in response to the number of spare server nodes in the current rack being greater than the preset threshold value, a spare server node in the current rack; determining in response to the number of spare server nodes in the current rack being less than or equal to the preset threshold value, an available rack having a next priority level in the available rack list as a current rack; and returning to perform an operation of determining whether a number of spare server nodes in the current rack is greater than the preset threshold value, until a spare server node in the current rack is located.

According to embodiments of the present disclosure, the re-ordering the available racks in the available rack list according to resource occupation information of the available racks in the available rack list includes: acquiring an application to which the current container belongs and a group to which the current container belongs; acquiring a previous resource occupation information of the current rack in the available rack list; acquiring a previous resource occupation information of another rack in the available rack list; determining a current resource occupation information of the current rack according to the application to which the current container belongs, the group to which the current container belongs, and the previous resource occupation information of the current rack; and re-ordering the available racks in the available rack list according to the current resource occupation information of the current rack in the available rack list and the previous resource occupation information of the another rack in the available rack list.

According to embodiments of the present disclosure, the previous resource occupation information of the current rack in the available rack list and the previous resource occupation information of the another rack in the available rack list include a number of containers belonging to a same application, a number of containers belonging to a same group, and a first vacant-seat value, wherein the first vacant-seat value is a ratio of a total resource of a rack to a resource used by all created containers.

According to embodiments of the present disclosure, the re-ordering the available racks in the available rack list according to the current resource occupation information of the current rack in the available rack list and the previous resource occupation information of the another rack in the available rack list includes; re-ordering the available racks in the available rack list according to a preset rack priority level rule, the current resource occupation information of the current rack in the available rack list and the previous resource occupation information of the another rack in the available rack list, wherein the preset rack priority level rule includes: the less a number of containers belonging to a same application in an available rack, the higher a priority level of the available rack; in response to the number of containers belonging to the same application being the same, the less a number of containers belonging to a same group in an available rack, the higher a priority level of the available rack; and in response to the number of containers belonging to the same group being the same, the greater a first vacant-seat value of an available rack, the higher a priority level of the available rack.

According to embodiments of the present disclosure, the method further includes: re-ordering server nodes in the available racks in the available rack list according to resource occupation information of the server nodes in the available racks in the available rack list, wherein the creating another container according to a spare server node in the re-ordered available racks in the available rack list and the updated available network address list includes: determining a new spare server node in the available racks according to the re-ordered available racks in the available rack list and the re-ordered server nodes in the available racks; and creating the another container according to the new spare server node and the updated available network address list.

According to embodiments of the present disclosure, the resource occupation information of the server nodes in the available racks in the available rack list includes a number of containers belonging to a same application, a number of containers belonging to a same group, and a second vacant-seat value, wherein the second vacant-seat value is a ratio of a total resource of a server node to a resource used by all created containers.

According to embodiments of the present disclosure, the re-ordering server nodes in the available racks in the available rack list according to resource occupation information of the server nodes in the available racks in the available rack list includes: re-ordering the server nodes in the available racks in the available rack list according to a preset server node priority level rule and the resource occupation information of the server nodes in the available racks in the available rack list, wherein the preset server node priority level rule includes: the less a number of containers belonging to a same application in a server node, the higher a priority level of the server node; in response to the number of containers belonging to the same application being the same, the less a number of containers belonging to a same group in a server node, the higher a priority level of the server node; and in response to the number of containers belonging to the same group being the same, the greater a second vacant-seat value of a server node, the higher a priority level of the server node.

Another aspect of the present disclosure provides an apparatus of creating a container, and the apparatus includes: an acquisition module configured to acquire an available rack list and an available network address list, wherein the available rack list includes a plurality of available racks of different available zones, each available rack includes at least one server node, and the available network address list includes at least one available network address; a locating module configured to locate a spare server node in the available racks in the available rack list; a first creation module configured to create, on the spare server node, a current container corresponding to the available network address; an update module configured to update the available network address list; a first sorting module configured to re-order the available racks in the available rack list according to resource occupation information of the available racks in the available rack list; and a second creation module configured to create another container according to a spare server node in the re-ordered available racks in the available rack list and the updated available network address list.

Another aspect of the present disclosure provides an electronic device, including: one or more processors; and a memory configured to store one or more programs, wherein the one or more programs, when executed by the one or more processors, is or are configured to cause the one or more processors to implement the method as described above.

Another aspect of the present disclosure provides a computer-readable storage medium having executable instructions therein, wherein the instructions, when executed by a processor, are configured to cause the processor to implement the method as described above.

Another aspect of the present disclosure provides a computer program including computer executable instructions, wherein the instructions, when executed by a processor, are configured to cause the processor to implement the method as described above.

BRIEF DESCRIPTION OF THE DRAWINGS

FIG. 4 schematically shows a flowchart of a method of creating a container according to an embodiment of the present disclosure;

DETAILED DESCRIPTION OF EMBODIMENTS

Figure 1:
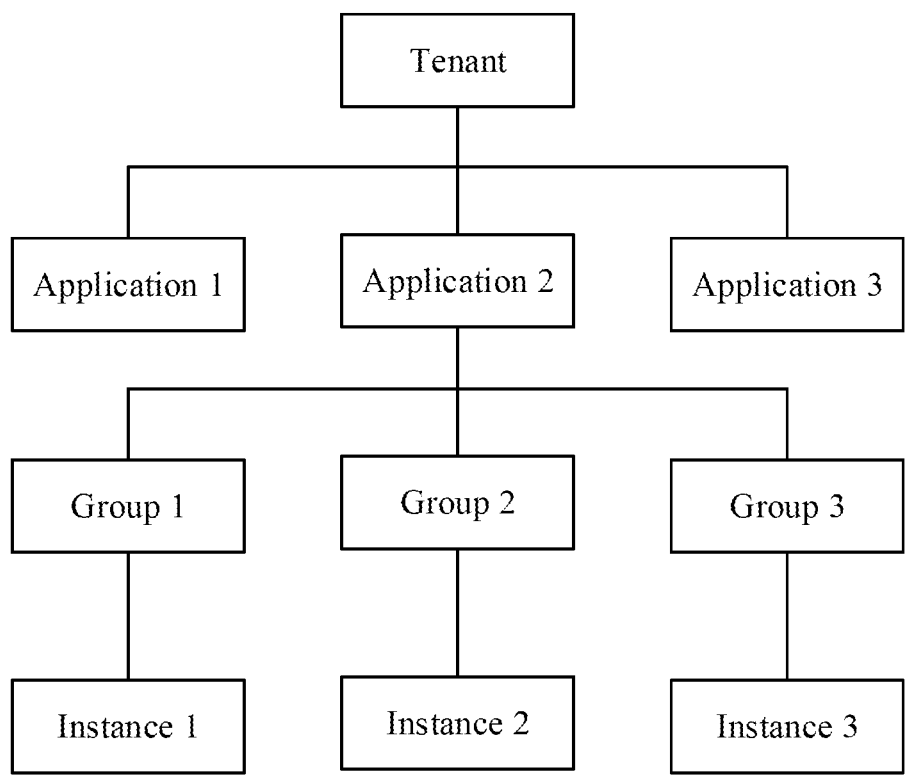
FIG. 1 schematically shows a schematic diagram of a service tree according to an embodiment of the present disclosure.

Embodiments of the present disclosure will be described below with reference to accompanying drawings. It should be understood that these descriptions are merely exemplary and are not intended to limit the scope of the present disclosure. In the following detailed descriptions, for the ease of description, many specific details are set forth to provide a comprehensive understanding of embodiments of the present disclosure. However, it is clear that one or more embodiments may also be implemented without these specific details. In addition, in the following descriptions, descriptions of well-known structures and technologies are omitted to avoid unnecessarily obscuring the concept of the present disclosure.

Terms used herein are only intended to describe specific embodiments and are not intended to limit the present disclosure. Terms "including", "containing", etc. used herein indicate the presence of the described features, steps, operations and/or components, but do not exclude the presence or addition of one or more other features, steps, operations and/or components.

All terms (including technical and scientific terms) used herein have meanings generally understood by those of ordinary skilled in the art, unless otherwise defined. It should be noted that the terms used herein should be interpreted as having the meaning consistent with the context of the present disclosure, and should not be interpreted in an idealized or overly rigid manner.

In response to an expression similar to "at least one selected from A, B, or C" is used, the expression should generally be interpreted according to the meaning of the expression generally understood by those of ordinary skilled in the art (for example, "a system having at least one selected from A, B, or C" shall include, but is not limited to, a system having A alone, having B alone, having C alone, having A and B, having A and C, having B and C, and/or having A B and C, etc.).

The technical solution provided by embodiments of the present disclosure may be used for a container arrangement of K8s in a private cloud scenario. In order to better understand the technical solution of embodiments of the present disclosure, a basic concept involved in embodiments of the present disclosure will be first described.

A private cloud is a complete cloud computing service that may be deployed by a cloud service provider for a customer in the customer's own data center. All resources in the private cloud are provided by the cloud service provider, and data is isolated both physically and on the network and may only be accessed through an intranet.

An available zone may be a data center in which a power and a network are independent from each other in a same region. As availabilities of different available zones do not affect each other, server nodes of a customer's service system may be deployed across available zones, which may greatly improve the availability.

A rack may be an integrated cabinet that includes a plurality of server nodes and provides a unified power supply and network access for the plurality of server nodes.

A server node may be a physical server device.

Across-available-zones may refer to allocating a plurality of containers to different available zones.

Across-racks may refer to allocating the plurality of containers to different racks in a same available zone.

Across-server-nodes may refer to allocating the plurality of containers to different server nodes in a same rack.

A high availability may refer to deploying the plurality of containers in a system in a balanced way. When a server node may not operate normally due to a failure, it may be guaranteed that a container on a server node that has no failure may operate normally and provide an external service so as to ensure the availability of the system.

A cluster may be a collection of computing, storage, and network resources.

A product line may be a cloud platform product on the private cloud, for example, a cloud hosting product.

A system may be an independent service module on the product line. The product line may include at least one system.

An application may be an independent functional module in the system. The system may include at least one application.

A group may be an independent module for solving problems of different scenarios in the application. The application may include at least one group. The group is configured to manage an environment variable and an external configuration required for a container operation, and is the minimum unit of deployment.

Node may refer to a working node in the cluster, and a real application is run on the Node. Kubelet and Proxy of K8s are run on the Node. The Kubelet and the Proxy are configured to be responsible for a creation, a startup, a monitoring, a restart, a destruction of Pod and achieve a load balancing of a software mode. The Node may include a Node address, a Node running status, a Node system capacity and other information. The Node address includes a network address of a host or an identifier of a host. The Node system capacity represents an available system resource of the Node, including CPU, a memory, the maximum number of schedulable Pods, etc.

Pod is the smallest deployable working unit that may be created and managed inn K8s. The Pod may include one container or more containers closely related with each other, such as Docker containers, which share a storage, a network, and a statement of how to run the containers. The containers in the Pod may be scheduled by a Master node as a whole to run on the same Node. The Pod is equivalent to a logical host. Each Pod has a corresponding network address. Different containers belonging to the same Pod share the same network address and port space. The network address of each Pod may change with a destruction and a restart of the Pod.

Service may be an external access interface of a set of Pods that provide a same service. The Service has a network address and a port. The Service provides a load balancing for the Pod.

Controller may be used to manage the Pod. Deployment features of the Pod are defined in the Controller, for example, how many replicas are included and on which Node to run. The Controller executes a running of the Pod in the K8s, and the Service executes an access of Pod.

Master node may be a master node of the cluster. The Master node is configured to host a control panel of the K8s to control and manage an entire cluster, on which runs a set of processes related to the cluster management such as ETCD, API Server, Controller Manager and Scheduler. The API Server, Controller Manager and Scheduler form a master control center of the K8s. The processes may implement management functions of the cluster, such as a resource management, a Pod scheduling, an elastic scaling, a security control, a system monitoring, an error correction, etc.

ETCD may be a highly available distributed key-value database, which may be used to persistently store all resource objects in the cluster. The ETCD is mainly used to store a configuration information of the cluster and a status information of various resources. When data changes, the ETCD may quickly notify relevant components of the K8s.

API (Application Programming Interface) Server may be an only external interface of K8s, and all requests need to communicate through the interface. The API Server provides an encapsulation interface that operates the ETCD. The encapsulation interface is substantially an interface that adds, deletes, modifies, and queries resource objects in the cluster, and monitors a resource change.

Controller Manager may be a management control center within the cluster. The Controller Manager is mainly configured to manage various resources of the cluster, so as to ensure that the resources are in a desired state. The Controller Manager may include a Replication Controller (RC), an Endpoints Controller, a Namespace Controller, a Service accounts Controller, etc. The RC is used to define the Pod, the number of replicas that the Pod needs to run, and a Pod label that needs to be monitored.

Scheduler may be a scheduler in the duster. The Scheduler is mainly used to determine which Node the Pod is allocated to run on.

Kubelet may be used to be responsible for a fall life-cycle management, such as a creation, a modification, a monitoring, a deletion, etc., of the Pod on the Node, while a status information of the Node is reported to the Master node.

Proxy may be a load balancer used to implement a proxy of Service and a software mode. The Proxy may be a reverse proxy server of an API Server. A client outside a K8s cluster may access the API Server through the Proxy.

An instance may be a plurality of resource allocation units having a same configuration and configured to support a grouping function. The plurality of containers support a high availability of a group.

An overbooking coefficient may mean that the cloud service provider divides a physical core logic on a physical server into a plurality of virtual cores, and the plurality of virtual cores share a function of a same physical core, and a resource of the physical core may be used by time slicing or other methods. The cloud service provider may allocate resources to more tenants through the overbooking coefficient, so that a resource utilization may be improved.

In order to solve the problem of container arrangement, the solution to be used may be to add a filtering or optimization strategy to the Scheduler of the K8s. In a process of implementing the concept of the present disclosure, it is found that the above-mentioned solution at least has a problem of difficulty in achieving a balanced arrangement of containers.

In the process of implementing the concept of the present disclosure, it is found that the main reason for the above-mentioned problem is that the above-mentioned solution does not consider a location distribution of server nodes in multi-available zones and in multi-racks. Due to numerous products and services involved in the private cloud and very strict requirements for a high availability of services, it is difficult for the above-mentioned solution to achieve the balanced arrangement of the containers. The balanced arrangement here refers to a balanced arrangement of containers in the same application at three levels of available zone, rack and server node, which may make it difficult to meet requirements for a high availability of services across available zones, across racks and across server nodes.

In order to achieve the balanced arrangement of the containers and ensure the high availability of services across available zones, across racks and across server nodes, it is necessary to preferentially allocate different containers in the same application to different available zones, preferentially allocate containers in the same available zone to different racks, and preferentially allocate containers in the same rack to different server nodes. Based on this, embodiments of the present disclosure provide a solution for achieving the balanced arrangement of the containers. It should be noted that, after determining which server node the container is allocated to, the container need to be created on the corresponding server node. Therefore, an implementation of a balanced creation of containers is an implementation of the balanced arrangement of the containers.

In order to better manage services in the cluster, embodiments of the present disclosure may adopt a tree structure (that is, a service tree) with a height of 4 to store complete cluster services. FIG. 1 schematically shows a schematic diagram of a service tree according to an embodiment of the present disclosure. As shown in FIG. 1, the service tree may include a tenant, an application, a group, and an instance from top to bottom. The tenant in a top layer is configured to manage a quota information in an entire cluster. The application in a second layer is configured to manage a deployment module and an environment variable information. The group in a third layer is configured to manage a program version, a configuration version, a container specification, and an environment variable. The instance in a fourth layer is configured to manage a container and a network address information. Each instance in the service tree corresponds to a Pod (that is, a set of containers) in the K8s. It should be noted that an implementation of the balanced arrangement of the containers described in embodiments of the present disclosure is an implementation of a balanced arrangement of instances.

Figure 2:
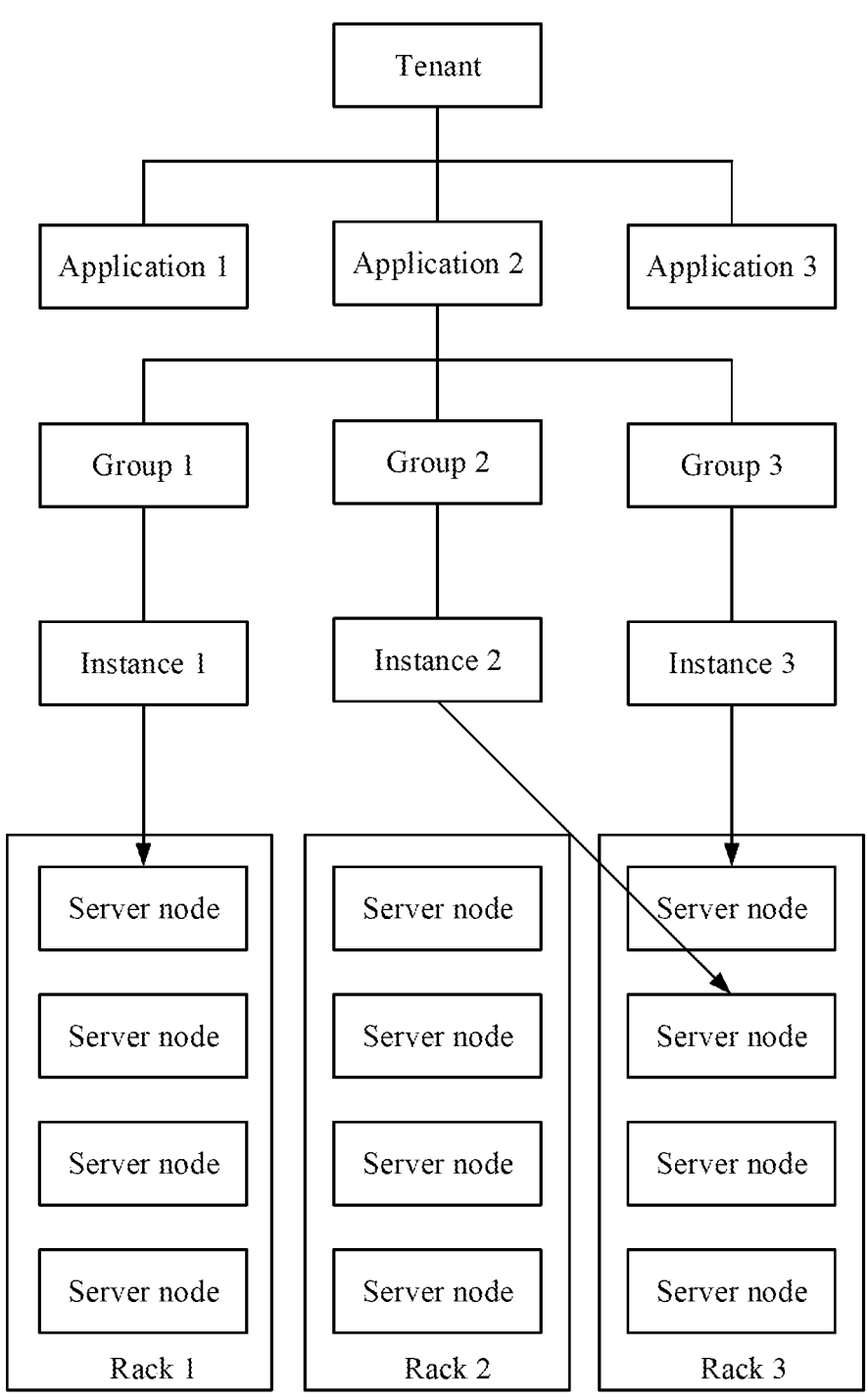
FIG. 2 schematically shows an instance arrangement in a related art.

FIG. 2 schematically shows an instance arrangement in the related art. As shown in FIG. 2, a rack 1, a rack 2 and a rack 3 are included, and each rack includes four server nodes. An application 1, an application 2 and an application 3 are included. The application 2 includes a group 1, a group 2 and a group 3. The group 1 includes an instance 1, the group 2 includes an instance 2, and the group 3 includes an instance 3. In the related art, the instance 1, the instance 2 and the instance 3 belonging to the same application 2 are allocated to a server node in the rack 1, a server node in the rack 3, and a server node in the rack 3, respectively. Thus, the instance 2 and the instance 3 belonging to the same application 2 are allocated to the same rack in the related art, that is, the balanced arrangement of the containers may not be achieved by using the related technology. This is because the available zone and the rack cannot be recognized in the related art. Therefore, a plurality of instances in the same application may be allocated to the same available zone or the same rack. If a dedicated line or rack in the available zone has a problem, it will easily lead to system paralysis and affect the overall function of the service. The technical solution provided by embodiments of the present disclosure is used to solve the above-mentioned problems, which will be described below in combination with specific embodiments.

Embodiments of the present disclosure provide a method and an apparatus of creating a container, an electronic device and a storage medium. The method includes a process of creating the container. In the process of creating the container, an available rack list and an available network address list are acquired, a spare server node in the available racks in the available rack list is located, a current container corresponding to the available network address is created on the spare server node, the available network address list is updated, the available racks in the available rack list are re-ordered according to resource occupation information of the available racks in the available rack list, and another container is created according to a spare server node in the re-ordered available racks in the available rack list and the updated available network address list.

Figure 3:
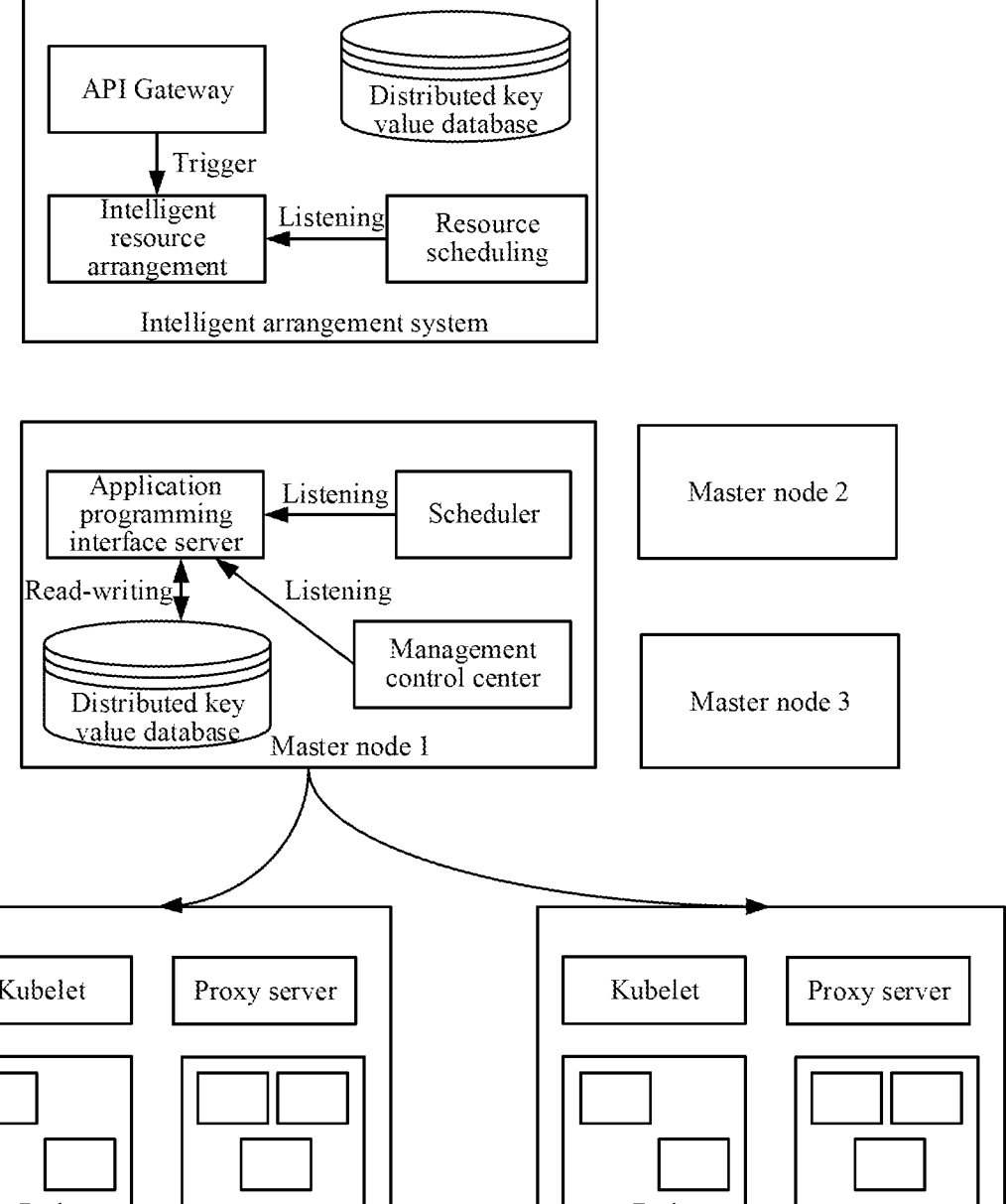
FIG. 3 schematically shows an exemplary system architecture to which a method of creating a container is applied according to an embodiment of the present disclosure.

FIG. 3 schematically shows an exemplary system architecture 300 to which a method of creating a container is applied according to an embodiment of the present disclosure. It should be noted that. FIG. 3 only shows an example of the system architecture in which embodiments of the present disclosure, may be applied, so as to help those skilled in the art understand the technical content of the present disclosure, but it does not mean that embodiments of the present disclosure may not be applied to other devices, systems, environments or scenarios.

As shown in FIG. 3, the system architecture 300 according to the embodiment may include an intelligent arrangement system, a master node (i.e., Master node), and a working node (i.e., Node). The intelligent arrangement system includes an API gateway, a distributed key-value database (ETCD), an intelligent resource arrangement and a resource scheduling. The master node includes a master node 1, a master node 2 and a master node 3. Working nodes corresponding to the master node 1 include a working node 1 and a working node 2. Each master node includes an application programming interface server (i.e., API Server), a scheduler (i.e., Scheduler), a distributed key-value database (i.e., ETCD) and a management control center (i.e., Controller Manager). Each working node includes Kubelet, a proxy server (i.e., Proxy) and Pod. Each Pod includes at least one container.

An existing K8s architecture includes the master node (i.e., Master node) and the working node (i.e., Node) shown in FIG. 3. An existing process of creating a container based on K8s includes: generating a RC request information through Kubectl, and send the RC request information to ETCD through the API Server. The ETCD stores the RC request information. The RC request information includes a to-be-created Pod, the number of replicas corresponding to the to-be-created Pod, and a label of the to-be-created Pod.

The Controller Manager listens to a RC event through a listening resource change interface in the API Server, and acquires the RC request information. If it is determined that no to-be-created Pod exists in a current cluster, the Pod is created according to the RC request information and is sent to the ETCD through the API Server. The ECTD stores the Pod.

The Scheduler listens to the RC event through the listening resource change interface in the API Server, and executes a scheduling process so as to generate an allocation relationship. The allocation relationship exists between Pod and a target Node that runs the Pod, and the allocation relationship is sent to the ETCD through the API Server. The ETCD stores the allocation relationship.

The Kubelet miming on the target Node detects the Pod through the API Server, and starts the Pod according to the RC request information until a life cycle of the Pod is reached.

As shown in FIG. 3, in embodiments of the present disclosure, an intelligent arrangement system is added to the existing K8s architecture. The API gateway in the intelligent arrangement system replaces the API Server of the Master node in the K8s as an only entrance to the entire cluster. The intelligent arrangement system takes over an allocation and partial scheduling of containers in the cluster.

As the intelligent arrangement system in embodiments of the present disclosure may be implemented independently and may be added to K8s without an invasion, the intelligent arrangement system may be applied to various K8s cluster environments without affecting an original system.

The method of creating the container provided in embodiments of the present disclosure may generally be performed by the intelligent arrangement system, and the intelligent arrangement system may be provided in a server or server cluster. Accordingly, the apparatus of creating the container provided in embodiments of the present disclosure may generally be provided in the server or server cluster.

FIG. 4 schematically shows a flowchart of a method of creating a container according to an embodiment of the present disclosure.

As shown in FIG. 4, the method includes operations S410 to S460.

In operation S410, an available rack list and an available network address list are acquired, where the available rack list includes a plurality of available racks of different available zones, each available rack includes at least one server node, and the available network address list includes at least one available network address.

According to embodiments of the present disclosure, the available rack list may include the plurality of available racks, different available racks may belong to different available zones, and each available rack may include at least one server node. The plurality of available racks in the available rack list may be sorted according to a priority level.

For example, the available rack list includes an available rack 1, an available rack 2, and an available rack 3. The available rack 1 and the available rack 2 belong to an available zone 1, and the available rack 3 belongs to an available zone 2. A server node 1, a server node 2, and a server node 3 are provided in the available rack 1. A server node 4 and a server node 5 are provided in the available rack 2. A server node 6, a server node 7, and a server node 8 are provided in the available rack 3.

The available network address list may include at least one available network address. Each available network address refers to a network address that may be configured to set the Pod but has not been used yet. The available network address list may be obtained as follows.

A total network address list is acquired. An assigned network address list is acquired. The available network address list is determined according to the total network address list and the assigned network address list. The assigned network address list includes at least one assigned network address, and each assigned network address refers to a network address that has set the Pod. Each network address in the total network address list may be used to set the Pod. The determining the available network address list according to the total network address list and the assigned network address list may include subtracting the assigned network address list from the total network address list so as to obtain the available network address list.

In operation S420, a spare server node in the available racks in the available rack list is located.

In operation S430, a current container corresponding to the available network address is created on the spare server node.

According to embodiments of the present disclosure, the available racks in the available rack list may or may not have the spare server node. The spare server node may refer to a server node with a spare resource. The spare resource may be understood as a resource used for setting a container.

In order to create the current container on the spare server node, it may be determined whether the available racks in the available rack list have a spare server node or not. If the available racks in the available rack list have a spare server node, then locating the spare server node.

As the available rack list includes the plurality of available racks, it may be determined whether each available rack has a spare server node or not in a preset order, until the spare server node is determined. In addition, as the plurality of available racks in the available rack list may be sorted according to a priority level, it may be determined whether each available rack has a spare server node or not in order of priority levels from high to low.

According to embodiments of the present disclosure, after the spare server node is determined, an available network address may be selected from the available network address list as a target network address, and a current container corresponding to the target network address may be created on the spare server node. The creating a current container corresponding to the target network address on the spare server node may include creating a current Pod corresponding to the target network address on the spare server node, and creating a current container instance in the current Pod.

In operation S440, the available network address list is updated.

In embodiments of the present disclosure, the current container correspond to the available network address is created on the spare server node, the available network address here may refer to the target network address, as the current container corresponding to the target network address is created, the target network address may change from the available network address to the assigned network address. Accordingly, the available network address included in the available network address list may change, and the available network address list needs to be updated.

According to embodiments of the present disclosure, the updating the available network address list may include deleting the target network address in the available network address list so as to obtain the updated available network address list.

In operation S450, the available racks in the available rack list are re-ordered according to resource occupation information of the available racks in the available rack list.

According to embodiments of the present disclosure, a resource occupation information of an available rack may represent a resource occupied by containers provided in the available rack. The resource occupation information of the available rack may include the number of containers belonging to a same application, the number of containers belonging to a same group, and a first vacant-seat value. The first vacant seat value may be a ratio of the total number of resources of the available rack to the number of resources used by all created containers.

According to embodiments of the present disclosure, as the resource occupation information of the available racks in the available rack list changes after the current container corresponding to the available network address is created on the spare server node, the available racks in the available rack list need to be re-ordered to obtain a re-ordered available rack list.

The re-ordering the available racks in the available rack list according to resource occupation information of the available racks in the available rack list may include: acquiring an application to which the current container belongs and a group to which the current container belongs; acquiring a previous resource occupation information of a current rack in the available rack list and a previous resource occupation information of another rack in the available rack list; determining a current resource occupation information of the current rack according to the application to which the current container belongs, the group to which the current container belongs, and the previous resource occupation information of the current rack; re-ordering the available racks in the available rack list according to the current resource occupation information of the current rack in the available rack list and the previous resource occupation information of the another rack in the available rack list, where the current rack may refer to an available rack having the highest priority level in the available rack list.

In operation S460, another container is created according to a spare server node in the re-ordered available racks in the available rack list and the updated available network address list.

According to embodiments of the present disclosure, each time a container is created, the available network address list needs to be updated, and racks in the available rack list need to be re-ordered to create a next container until all containers are created. Creating a container on a corresponding spare server node is equivalent to allocating the container to the corresponding spare server node.

According to embodiments of the present disclosure, a resource request may be acquired. The resource request may include the number of to-be-created containers. In response to the resource request, a current available rack list and a current available network address list are acquired. A spare server node in available racks in the current available rack list is located. A current container corresponding to a current available network address is created on the spare server node. The current available network address list is updated to obtain a new available network address list, and the new network address list is used as a current available network address list. The available racks in the current available rack list are re-ordered according to resource occupation information of the available racks in the current available rack list, so as to obtain a new available rack list, and the new available rack list is used as a current available rack list. Operations of locating a spare server node in available racks in the current available rack list and creating a current container corresponding to the current available network address on the spare server node are repeatedly performed until a creation of the containers of the number of to-be-created containers is completed.

According to embodiments of the present disclosure, the resource request may also include a specification of the to-be-created container, an application to which the to-be-created container belongs, and a group to which the to-be-created container belongs. The specification of the to-be-created container may refer to a CPU and a memory required by the to-be-created container.

According to the technical solution of embodiments of the present disclosure, an available rack list and an available network address list are acquired, where the available rack list includes a plurality of available racks of different available zones, each available rack includes at least one server node, and the available network address list includes at least one available network address, a spare server node in the available racks in the available rack list is located, a current container corresponding to the available network address is created on the spare server node, the available network address list is updated, the available racks in the available rack list are re-ordered according to resource occupation information of the available racks in the available rack list, and another container is created according to a spare server node in the re-ordered available racks in the available rack list and the updated available network address list. Each time a container is created on a spare server node, the available racks in the available rack list may be re-ordered according to the resource occupation information of the available racks in the available rack list, and then a next container may be created according to a spare server node in the re-ordered available racks in the available rack list and the updated available network address list. The spare server nodes come from the available racks of different available zones. Therefore, the balanced arrangement of the containers may be achieved, and the technical problem that it is difficult to achieve the balanced arrangement of the containers by using the related technology may be at least partially overcome. In addition, since the balanced arrangement of the containers is achieved, requirements for a high availability of services across available zones, across racks and across server nodes are met, so that an occurrence of system paralysis may be effectively avoided.

According to embodiments of the present disclosure, the acquiring an available rack list may include the following operation.

A total resource of each server node in each rack is acquired. A used resource of each server node is acquired, where the used resource is a resource used by a created container. The available racks are determined according to the total resource of each server node and the used resource of each sever node. The available rack list is generated according to the available racks.

According to embodiments of the present disclosure, the total resource of each server node may be determined as follows. A resource of a server node is acquired, and the resource of the server node includes a CPU and a memory. An overbooking coefficient corresponding to the server node is acquired. A total resource of the server node is determined according to the resource of the server node and the overbooking coefficient, that is, the total resource of the server node may be obtained by multiplying the resource of the server node and the overbooking coefficient.

For each server node in each rack, the determining the available racks according to the total resource of the server node and the used resource of the server node may include subtracting the used resource of the server node from the total resource of the server node so as to obtain a remaining resource of the server node. Based on this, the remaining resource of each server node in the rack may be obtained. It may be determined whether the rack is an available rack according to the remaining resource of each server node in the rack. If the remaining resource of each server node in the rack is greater than or equal to a remaining resource threshold value, the rack may be determined as the available rack. The remaining resource threshold value may be determined according to an actual situation, which will not be limited here.

According to embodiments of the present disclosure, the plurality of available racks in the available rack list are sorted according to a priority level.

According to embodiments of the present disclosure, in order to achieve the balanced arrangement of the containers, the plurality of available racks in the available rack list may be sorted according to priority levels from high to low, so that a spare server node may be subsequently selected according to priority levels of the available racks, and a container may be created on the spare server node.

According to embodiments of the present disclosure, the plurality of available racks in the available rack list are sorted according to a priority level by: acquiring a created container list, where the created container list includes a plurality of created containers, and each created container has a corresponding server node, an application to which the created container belongs, and a group to which the created container belongs; determining a creation quantity information corresponding to each server node, where the creation quantity information includes the number of created containers belonging to a same application and the number of created containers belonging to a same group; and prioritizing the plurality of available racks in the available rack list according to the creation quantity information corresponding to each server node.

According to embodiments of the present disclosure, in order to prioritize the plurality of available racks in the available rack list, the created container list may be acquired. The created container list may include the plurality of created containers, and the created container may refer to a created Pod. Each created container has a corresponding server node, which means that each created container has a server node to which the created container belongs. While each created container has the application to which the created container belongs and the group to which the created container belongs.

According to embodiments of the present disclosure, the determining a creation quantity information corresponding to each server node may include: for each created container, increasing a count of the application to which the created container belongs on a server node corresponding to the created container by 1 and increasing a count of the group to which the created container belongs on a server node corresponding to the created container by 1. Based on this, the application to which each created container belongs and the group to which each created container belongs may be associated to the corresponding server node.

According to embodiments of the present disclosure, for each server node, the creation quantity information corresponding to the server node is determined, where each creation quantity information may include the number of created containers belonging to the same application and the number of created containers belonging to the same group. According to creation quantity information of all server nodes included in each available rack, a creation quantity information of the available rack may be determined, that is, the number of the created containers in the available rack belonging to the same application and the number of the created containers in the available rack belonging to the same group. Based on this, creation quantity information of the available racks in the available rack list may be obtained.

According to embodiments of the present disclosure, the prioritizing the available racks in the available rack list according to the creation quantity information of the available racks in the available rack list may include: prioritizing the available racks in the available rack list according to a preset rack priority level rule and the creation quantity information of the available racks in the available rack list, where the preset rack priority level rule may include: the less a number of containers belonging to a same application in an available rack, the higher a priority level of the available rack; in response to the number of containers belonging to the same application being the same, the less a number of containers belonging to a same group in an available rack, the higher a priority level of the available rack; and in response to the number of containers belonging to the same group being the same, the greater a first vacant-seat value of an available rack, the higher a priority level of the available rack. The first vacant-seat value may be a ratio of a total resource of the available rack to a resource used by all created containers, and the number of the containers here refers to the number of created containers.

For example, the created container list includes a created container 1, a created container 2, and a created container 3. The available rack list includes the available rack 1 and the available rack 2. The available rack 1 includes the server node 1, the server node 2, and the server node 3. The available rack 2 includes the server node 4 and the server node 5.

A server node corresponding to the created container 1 is the server node 1, an application to which the created container 1 belongs is application 1, and a group to which the created container 1 belongs is group 1.

A server node corresponding to the created container 2 is the server node 1, an application to which the created container 2 belongs is application 1, and a group to which the created container 2 belongs is group 1.

A server node corresponding to the created container 3 is the server node 4, an application to which the created container 3 belongs is application 1, and a group to which the created container 3 belongs is group 2.

For the server node 1, a creation quantity information corresponding to the server node 1 is determined. The creation quantity information includes that: the number of created containers belonging to application 1 is 2, and the number of created containers belonging to group 1 is 2.

For the server node 2, a creation quantity information corresponding to the server node 2 is determined. The creation quantity information is 0.

For the server node 3, a creation quantity information corresponding to the server node 3 is determined. The creation quantity information is 0.

For the server node 4, a creation quantity information corresponding to the server node 4 is determined. The creation quantity information includes that: the number of the created containers belonging to application 1 is 1, and the number of created containers belonging to group 2 is 1.

For the server node 5, a creation quantity information corresponding to the server node 5 is determined. The creation quantity information is 0.

For the server node 6, a creation quantity information corresponding to the server node 6 is determined. The creation quantity information is 0.

According to the creation quantity information of the server node 1, the creation quantity information of the server node 2 and the creation quantity information of the server node 3, it is determined that a creation quantity information of the available rack 1 includes that: the number of the created containers belonging to application 1 is 2, and the number of the created containers belonging to the group 1 is 2.

According to the server node 4 and server node 5, it is determined that a creation quantity information of the available rack 2 includes that: the number of the created containers belonging to application 1 is 1, and the number of the created containers belonging to group 2 is 1.

The available rack 1 and the available rack 2 are prioritized according to the preset rack priority level rule, the creation quantity information of the available rack 1 and the creation quantity information of the available rack 2. As the number of created containers belonging to the same application 1 in the available rack 1 is greater than the number of created containers belonging to the same application 1 in the available rack 2, the available rack 2 has a higher priority level than a priority level of the available rack 1.

According to embodiments of the present disclosure, the available racks in the available rack list are prioritized to provide a basis for the balanced arrangement of the containers at a rack level.

According to embodiments of the present disclosure, the locating a spare server node in the available racks in the available rack list may include the following operation.

An available rack having a highest priority level in the available rack list is determined as a current rack. It may be determined whether the number of spare server nodes in the current rack is greater than a preset threshold value or not.

In response to the number of spare server nodes in the current rack being greater than the preset threshold value, a spare server node in the current rack is located. In response to the number of spare server nodes in the current rack being less than or equal to the preset threshold value, an available rack having a next priority level in the available rack list is determined as a current rack. An operation of determining whether the number of spare server nodes in the current rack is greater than the preset threshold value or not is executed, until a spare server node in the current rack is located.

In embodiments of the present disclosure, as the plurality of available racks in the available rack list are sorted according to a priority level, a spare server node may be determined according to priority levels of the available racks.

According to embodiments of the present disclosure, the available rack having the highest priority level in the available rack list is determined as the current rack, and it may be determined whether the number of spare server nodes in the current rack is greater than the preset threshold value or not. In response to the number of spare server nodes in the current rack being greater than the preset threshold value, the spare server node is located from the current rack. In response to the number of spare server nodes in the current rack being less than or equal to the preset threshold value, an available rack having the next priority level in the available rack list is determined as a current rack, and the operation of determining whether the number of spare server nodes in the current rack is greater than the preset threshold value or not may be executed until a spare server node is located from the current rack.

According to embodiments of the present disclosure, the plurality of server nodes included in each available rack in the available rack list are sorted according to a priority level. The plurality of server nodes may be sorted according to a priority level by: acquiring a created container list, where the created container list includes a plurality of created containers, and each created container has a corresponding server node, an application to which the created container belongs, and a group to which the created container belongs; determining a creation quantity information corresponding to each server node, where the creation quantity information includes the number of created containers belonging to the same application and the number of created containers belonging to the same group, and prioritizing the plurality of server nodes according to the creation quantity information corresponding to each server node.

The plurality of server nodes are prioritized according to a preset server node priority level rule and the creation quantity information corresponding to each server node. The preset server node priority level rule may include: the less a number of containers belonging to a same application in a server node, the higher a priority level of the server node; in response to the number of containers belonging to the same application being the same, the less a number of containers belonging to a same group in a server node, the higher a priority level of the server node; and in response to the number of containers belonging to the same group being the same, the greater a second vacant-seat value of a server node, the higher a priority level of the server node. The second vacant-seat value may be a ratio of a total resource of the server node to a resource used by all created containers, and the number of containers here refers to the number of created containers.

According to embodiments of the present disclosure, the re-ordering the available racks in the available rack list according to resource occupation information of the available racks in the available rack list may include the following operation.

An application to which the current container belongs and a group to which the current container belongs are acquired. A previous resource occupation information of the current rack in the available rack list is acquired. A previous resource occupation information of another rack in the available rack list is acquired. A current resource occupation information of the current rack is determined according to the application to which the current container belongs, the group to which the current container belongs, and the previous resource occupation information of the current rack. The available racks in the available rack list are re-ordered according to the current resource occupation information of the current rack in the available rack list and the previous resource occupation information of the another rack in the available rack list.

According to embodiments of the present disclosure, as the previous resource occupation information of the current rack changes after the current container is created on the spare server node in the current rack, the previous resource occupation information of the current rack needs to be updated to obtain the current resource occupation information of the current rack according to the application to which the current container belongs and the group to which the current container belongs.

In order to re-order the available racks in the available rack list, the previous resource occupation information of another rack other than the current rack in the available rack list also needs to be acquired. The number of another racks is one or more. The previous resource occupation information of the current rack and the previous resource occupation information of the another rack both refer to a resource occupation information of the current rack and a resource occupation information of the another rack before the current container is created.

After the current resource occupation information of the current rack and the previous resource occupation information of the another rack are obtained, the available racks in the available rack list may be re-ordered according to the current resource occupation information of the current rack and the previous resource occupation information of the another rack.

According to embodiments of the present disclosure, the previous resource occupation information of the current rack in the available rack list and the previous resource occupation information of the another rack in the available rack list include the number of containers belonging to the same application, the number of containers belonging to the same group, and the first vacant-seat value. The first vacant-seat value is a ratio of a total resource of a rack to a resource used by all created containers.

According to embodiments of the present disclosure, the resource occupation information of the available racks in the available rack list includes the number of the containers belonging to the same application the number of the containers belonging, to the same group, and the first vacant-seat value. The available racks include the current rack and another rack. The resource occupation information includes the current resource occupation information of the current rack and the previous resource occupation information of the another rack. The first vacant-seat value may represent a resource information of a rack.

According to embodiments of the present disclosure, the re-ordering the available racks in the available rack list according to the current resource occupation information of the current rack in the available rack list and the previous resource occupation information of the another rack in the available rack list may include the following operation.

The available racks in the available rack list are re-ordered according to a preset rack priority level rule, the current resource occupation information of the current rack in the available rack list and the previous resource occupation information of the another rack in the available rack list, where the preset rack priority level rule includes: the less a number of containers belonging to a same application in an available rack, the higher a priority level of the available rack; in response to the number of containers belonging to the same application being the same, the less a number of containers belonging to a same group in an available rack, the higher a priority level of the available rack; and in response to the number of containers belonging to the same group being the same, the greater a first vacant-seat value of an available rack, the higher a priority level of the available rack.

According to embodiments of the present disclosure, in order to achieve the balanced arrangement of the containers in the racks, containers in the same available zone need to be preferentially allocated to different racks. In order to preferentially allocate the containers in the same available zone to different racks, the preset rack priority level rule may be set.

As the current resource occupation information of the current rack includes the number of the containers belonging to the same application, the number of the containers belonging to the same group and the first vacant-seat value, and the previous resource occupation information of another rack includes the number of the containers belonging to the same application, the number of the containers belonging to the same group and the first vacant seat value, for each application, the available racks in the available rack list may be re-ordered according to the preset rack priority level rule, where the preset rack priority level rule includes: the less a number of containers belonging to a same application in an available rack, the higher a priority level of the available rack; in response to the number of containers belonging to the same application being the same, the less a number of containers belonging to a same group in an available rack, the higher a priority level of the available rack; and in response to the number of containers belonging to the same group being the same, the greater a first vacant-seat value of an available rack, the higher a priority level of the available rack. The available racks include the current rack and another rack.

According to embodiments of the present disclosure, the available racks in the available rack list are prioritized to provide a basis for the balanced arrangement of the containers at the rack level.

According to embodiments of the present disclosure, the method of creating the container may further include the following operation.

Server nodes in the available racks in the available rack list are re-ordered according to resource occupation information of the server nodes in the available racks in the available rack list.

The creating another container according to a spare server node in the re-ordered available racks in the available rack list and the updated available network address list may include the following operation.

A new spare server node in the available racks is determined according to the re-ordered available racks in the available rack list and the server nodes in the available racks.

The another container is created according to the new spare server node and the updated available network address list.

According to embodiments of the present disclosure, the application to which the current container belongs and the group to which the current container belongs may be acquired. A previous resource occupation information of a server node in the available rack list is acquired. A previous resource occupation information of a spare server node is updated according to the application to which the current container belongs and the group to which the current container belongs, so as to obtain a current resource occupation information of the spare server node. The server nodes in the available racks in the available rack list are re-ordered according to the current resource occupation information of the spare server node in the available racks in the available rack list and the previous resource occupation information of another server node other than the spare server node in the available racks in the available rack list.

After the re-ordered available racks in the available rack list and the re-ordered server nodes in the available racks are obtained, the new spare server node in the available racks may be determined according to the re-ordered available racks in the available rack list and the re-ordered server nodes in the available racks.

According to embodiments of the present disclosure, as the server nodes in the available racks in the available rack list may be sorted according to a priority level, a spare server node may be located according to priority levels of the server nodes. That is, the available rack having the highest priority level in the available rack list may be determined as a current rack. A server node having the highest priority level in the current rack may be determined as a current server node. It may be determined whether the current server node is a spare server node or not. If the current server node is a spare server node, the current server node is determined as the spare server node. If the current server node is not a spare server node, a server node having a next priority level in the current rack is determined as a current server node, and an operation of determining whether the current server node is a spare server node or not is executed until the spare server node is located.

If the spare server node may not be located in the current rack, an available rack having a next priority level in the available rack list may be determined as a current rack, and a server node having the highest priority level in the current rack may be determined as a current server node, until the spare server node is located.

According to embodiments of the present disclosure, the resource occupation information of the server nodes in the available racks in the available rack list includes the number of containers belonging to the same application, the number of containers belonging to the same group, and the second vacant-seat value, where the second vacant-seat value is a ratio of a total resource of a server node to a resource used by all created containers.

According to embodiments of the present disclosure, the second vacant-seat value may represent a resource information of a server node.

According to embodiments of the present disclosure, the re-ordering server nodes in the available racks in the available rack list according to resource occupation information of the server nodes in the available racks in the available rack list may include the following operation.

The server nodes in the available racks in the available rack list are re-ordered according to a preset server node priority level rule and the resource occupation information of the server nodes in the available racks in the available rack list, where the preset server node priority level rule may include: the less a number of containers belonging to a same application in a server node, the higher a priority level of the server node; in response to the number of containers belonging to the same application being the same, the less a number of containers belonging to a same group in a server node, the higher a priority level of the server node; and in response to the number of containers belonging to the same group being the same, the greater a second vacant-seat value of a server node, the higher a priority level of the server node.

According to embodiments of the present disclosure, in order to achieve the balanced arrangement of the containers on the server nodes, containers on the same rack need to be preferentially allocated to different server nodes. In order to preferentially allocate the containers on the same rack to different server nodes, the preset server priority level rule may be set.

As the resource occupation information of the server nodes includes the number of the containers belonging to the same application, the number of the containers belonging to the same group, and the second vacant-seat value, for each application, the server nodes in the available racks in the available rack list may be re-ordered according to the preset server node priority level rule, where the preset server node priority level rule may include: the less a number of containers belonging to a same application in a server node, the higher a priority level of the server node; in response to the number of containers belonging to the same application being the same, the less a number of containers belonging to a same group in a server node, the higher a priority level of the server node; and in response to the number of containers belonging to the same group being the same, the greater a second vacant-seat value of a server node, the higher a priority level of the server node.

According to embodiments of the present disclosure, the server nodes in the available racks in the available rack list are prioritized to provide a basis for the balanced arrangement of the containers at the server node level.

Figure 5:
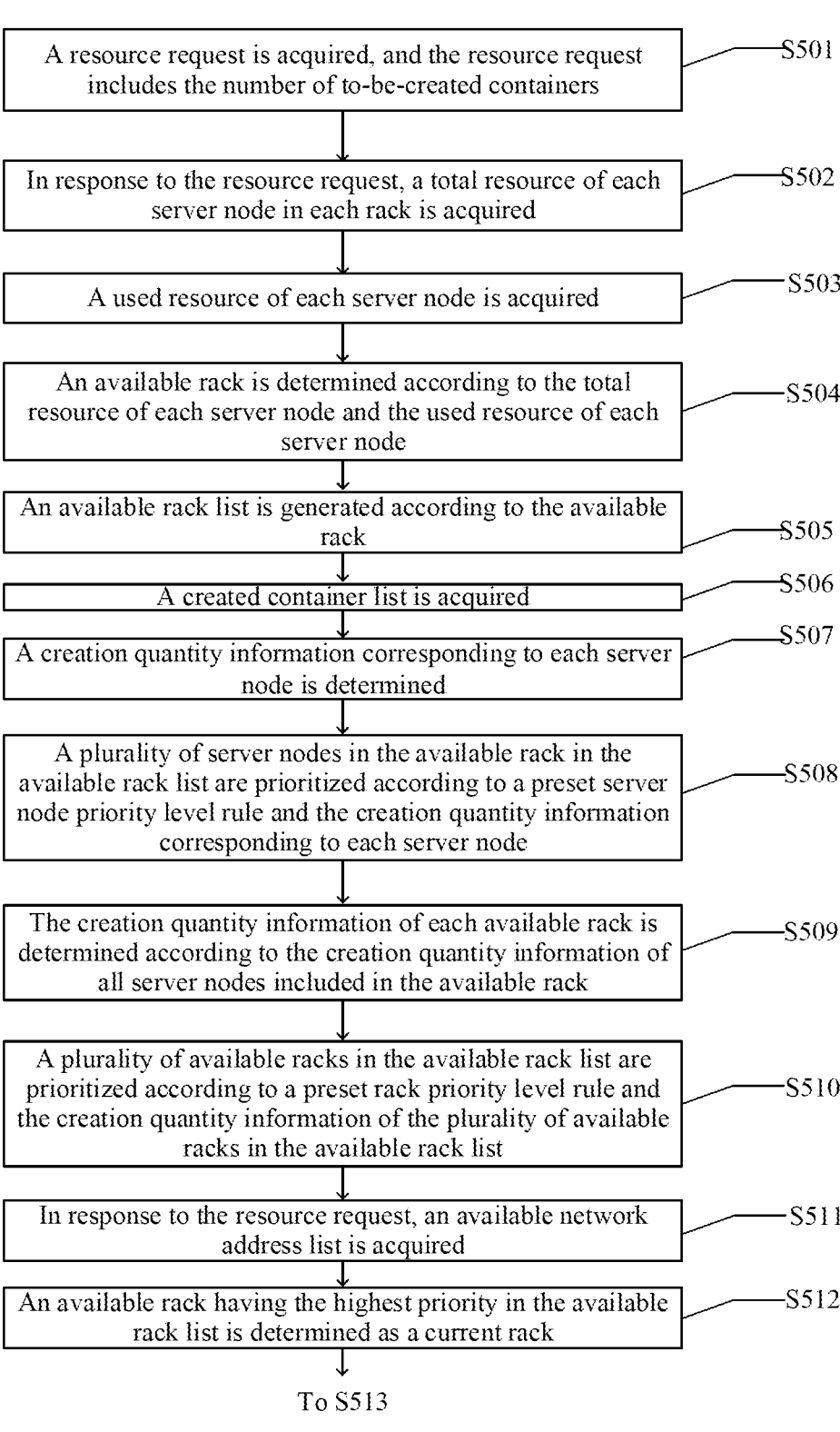
FIG. 5 schematically shows a flowchart of another method of creating a container according to an embodiment of the present disclosure.
Figure 5:
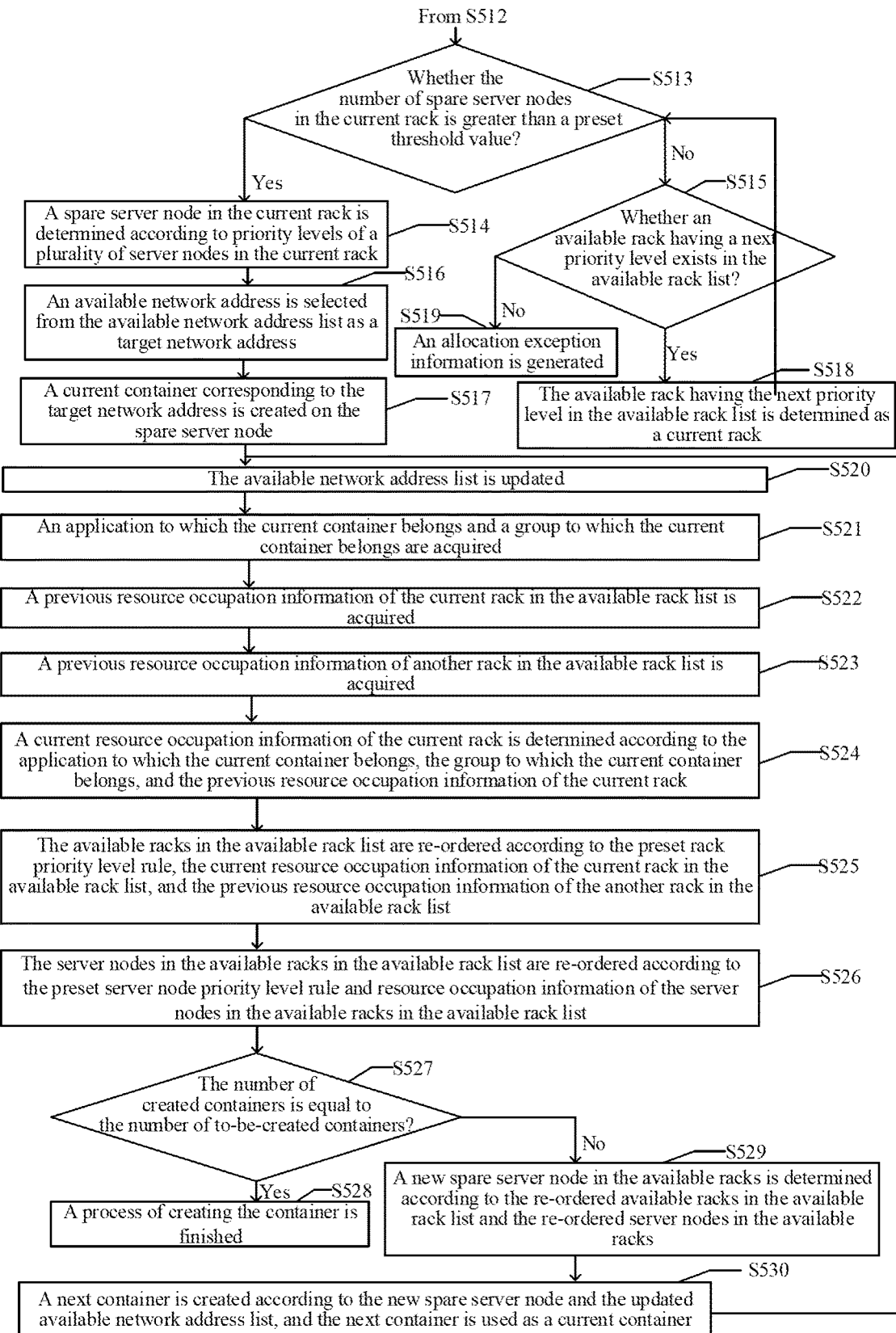

FIG. 5 schematically shows a flowchart of another method of creating a container according to an embodiment of the present disclosure.

As shown in FIG. 5, the method includes operations S501 to S530.

In operation S501, a resource request is acquired, where the resource request includes the number of to-be-created containers.

In operation S502, in response to the resource request, a total resource of each server node in each rack is acquired.

In operation S503, a used resource of each server node is acquired, where the used resource is a resource used by a created container.

In operation S504, an available rack is determined according to the total resource of each server node and the used resource of each server node.

In operation S505, an available rack list is generated according to the available rack.

In operation S506, a created container list is acquired, where the created container list includes a plurality of created containers, and each created container has a corresponding server node, an application to which the created container belongs, and a group to which the created container belongs.

In operation S507, a creation quantity information corresponding to each server node is determined, where the creation quantity information includes the number of created containers belonging to the same application and the number of created containers belonging to the same group.

In operation S508, a plurality of server nodes in the available rack in the available rack list are prioritized according to a preset server node priority level rule and the creation quantity information corresponding to each server node.

In operation S509, a creation quantity information of each available rack is determined according to the creation quantity information of all server nodes included in the available rack.

In operation S510, a plurality of available racks in the available rack list are prioritized according to a preset rack priority level rule and the creation quantity information of the plurality of available racks in the available rack list.

In operation S511, in response to the resource request, an available network address list is acquired, where the available network address list includes at least one available network address.

In operation S512, an available rack having the highest priority level in the available rack list is determined as a current rack.

In operation S513, it may be determined whether the number of spare server nodes in the current rack is greater than a preset threshold value or not. If the number of spare server nodes in the current rack is greater than the preset threshold value, then operation S514 is performed; and if the number of spare server nodes in the current rack is not greater than the preset threshold value, then operation S515 is performed.

In operation S514, a spare server node in the current rack is determined according to priority levels of a plurality of server nodes in the current rack, and operation S516 is performed.

In operation S515, it may be determined whether an available rack having a next priority level exists in the available rack list. If the available rack having the next priority level exists in the available rack list, then operation S518 is performed; and if no available rack having the next priority level exists in the available rack list, then operation S519 is performed.

In operation S516, an available network address is selected from the available network address list as a target network address.

In operation S517, a current container corresponding to the target network address is created on the spare server node, and operation S520 is performed.

In operation S518, the available rack having the next priority level in the available rack list is determined as a current rack, and then operation S513 is performed.

In operation S519, an allocation exception information is generated.

In operation S520, the available network address list is updated.

In operation S521, an application to which the current container belongs and a group to which the current container belongs are acquired.

In operation S522, a previous resource occupation information of the current rack in the available rack list is acquired.

In operation S523, a previous resource occupation information of another rack in the available rack list is acquired.

In operation S524, a current resource occupation information of the current rack is determined according to the application to which the current container belongs, the group to which the current container belongs, and the previous resource occupation information of the current rack.

In operation S525, the available racks in the available rack list are re-ordered according to the preset rack priority level rule, the current resource occupation information of the current rack in the available rack list, and the previous resource occupation information of the another rack in the available rack list.

In operation S526, the server nodes in the available racks in the available rack list are re-ordered according to the preset server node priority level rule and a resource occupation information of the server nodes in the available racks in the available rack list.

In operation S527, it may be determined whether the number of created containers is equal to the number of the to-be-created containers or not. If the number of the created containers is not equal to the number of the to-be-created containers, then operation S528 is performed; and if the number of the created containers is equal to the number of the to-be-created containers, then operation S529 is performed.

In operation S528, a new spare server node in the available racks is determined according to the re-ordered available racks in the available rack list and the re-ordered server nodes in the available racks, and operation S530 is performed.

In operation S529, a process of creating the container is finished.

In operation S530, a next container is created according to the new spare server node and the updated available network address list, the next container is used as a current container, and then operation S520 is performed.

According to embodiments of the present disclosure, an essence of a method of creating a container based on the K8s in embodiments of the present disclosure is to allocate different containers (i.e. instances in a service tree) in the same application to corresponding server nodes based on a scheduling strategy according to a station information of an available zone, a rack and a server node in a deployment environment and a cluster service information in the service tree shown in FIG. 1, so as to achieve the balanced arrangement of the containers. After determining which server node the container is allocated to, the container need to be created on the corresponding server node. Therefore, an implementation of a balanced creation of containers is an implementation of the balanced arrangement of the containers.

According to embodiments of the present disclosure, the scheduling strategy includes: 1. for a scenario of multi-available zones, different containers in the same application are preferentially allocated to different available zones; 2. on a premise of ensuring 1, for the available zone including a plurality of racks and a plurality of containers in the same application allocated in the available zone, the containers in the same available zone are preferentially allocated to different racks; on a premise of ensuring 2, for the rack including a plurality of server nodes and the plurality of containers in the same application allocated in the rack, the containers in the same rack are preferentially allocated to different server nodes. Through the above-mentioned scheduling strategy, the balanced arrangement of the containers in the same application may be achieved at three levels of available zone, rack and server node.

Figure 6:
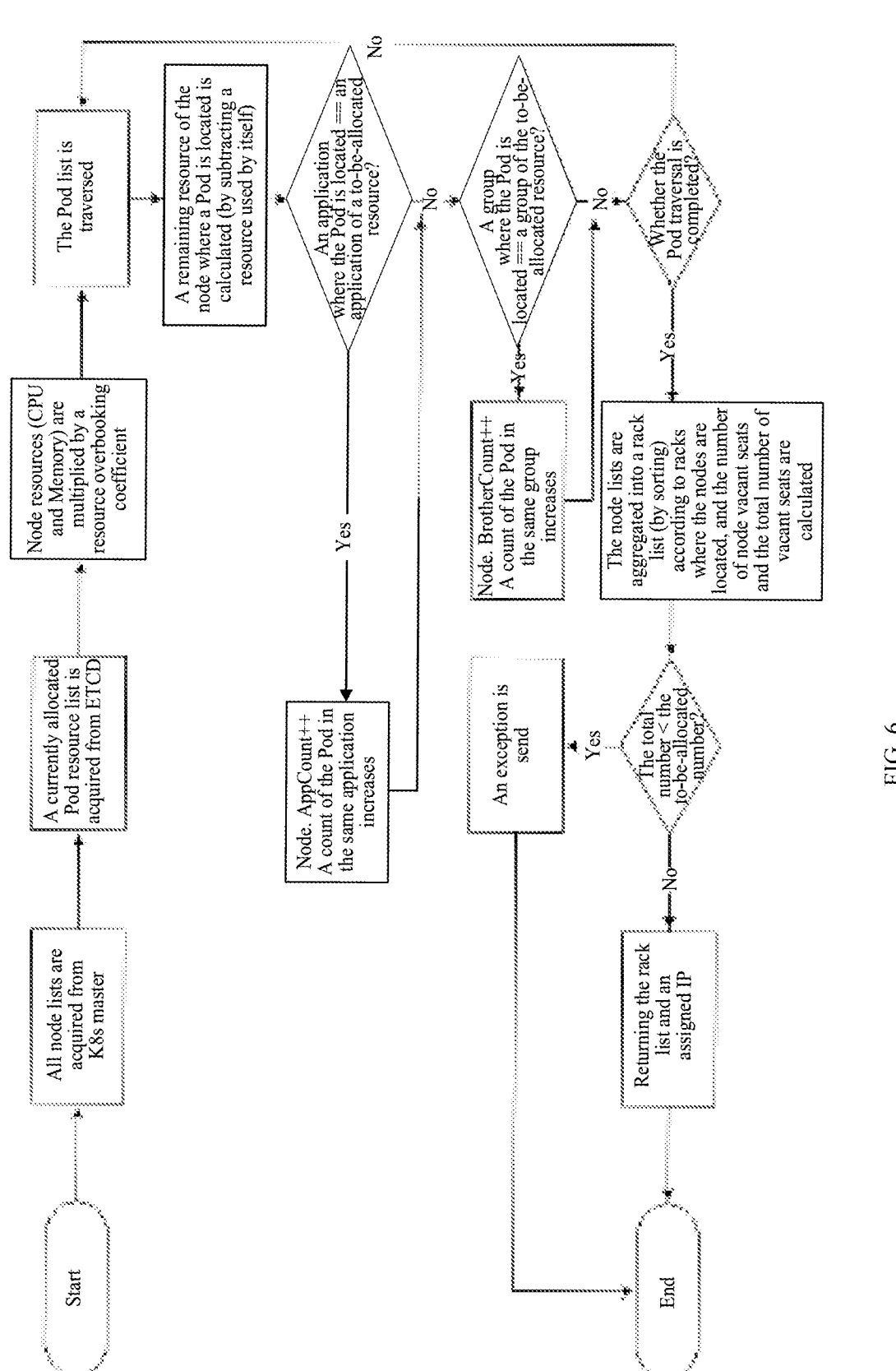
FIG. 6 schematically shows a flowchart of a computing resource flow according to an embodiment of the present disclosure.

FIG. 6 schematically shows a flowchart of a computing resource flow according to an embodiment of the present disclosure. FIG. 6 shows a process of generating an available rack list, which is an illustration of operations S502 to S510.

K8s master shown in FIG. 6 is the Master node described above. A node list refers to a server node list. A node resource is a resource of a server node described above. An application where a pod is located=an application of a to-be-allocated resource means that if the application where the pod is located is the application of the to-be-allocated resource, a count of the pod in the same application is increased by 1. That is, for each created container, a count of the application to which the created container belongs on the server node corresponding to the created container is increased by 1. A group where the pod is located=a group of the to-be-allocated resource means that if the group where the pod is located is the group of the to-be-allocated resource, a count of the pod in the same group is increased by 1. That is, for each created container, a count of the group to which the created container belongs on the server node corresponding to the created container is increased by 1.

After all pod lists are traversed, the server node list may be used to calculate the resource status of the racks according to the racks where the server nodes are located so as to generate the available rack list. In addition, the racks are prioritized according to the preset rack priority level rale in operation S510. The server nodes in the rack are prioritized according to the preset server node priority level rule in operation S508.

In addition, the number of node vacant seats and the total number of vacant seats are calculated, the total number of vacant seats is compared with the number of to-be-allocated containers calculated in response to the resource request, so as to determine whether the resource request may be responded to. That is, if the total number of vacant seats is greater than or equal to the to-be-allocated number, the available rack list and the assured network address list may be returned. If the total number of vacant seats is less than the to-be-allocated number, the allocation exception information may be generated.

It should be noted that, each time the container is created, the available racks in the available rack list need to be re-ordered, and the server nodes in the available racks in the available rack list need to be re-ordered.

Figure 7:
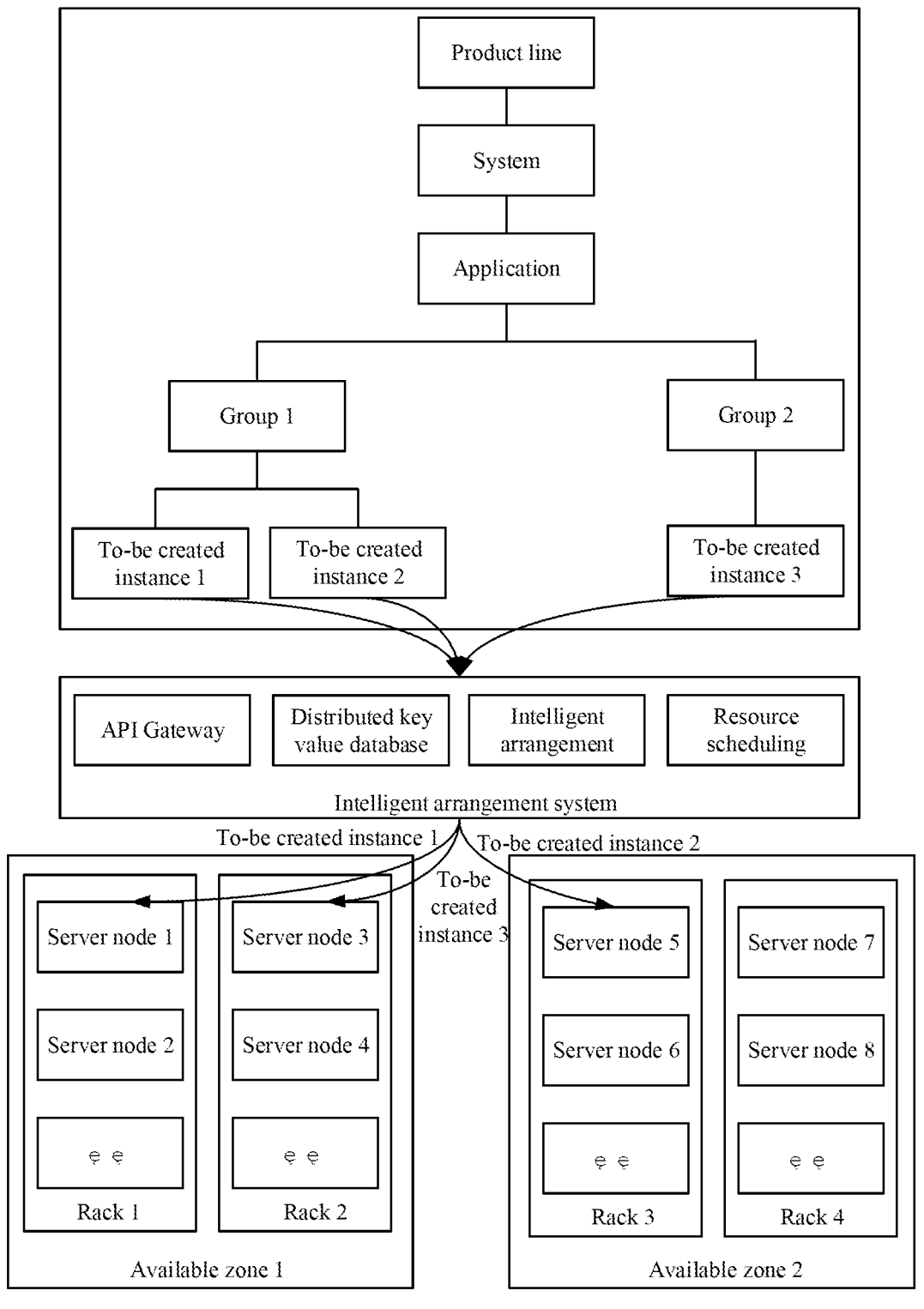
FIG. 7 schematically shows an application diagram of a method of creating a container according to an embodiment of the present disclosure.

FIG. 7 schematically shows an application diagram of a method of creating a container according to an embodiment of the present disclosure. A system application shown in FIG. 7 includes five layers, that is, a product line, a system, an application, a group and an instance. A to-be-created instance 1, a to-be-created instance 2 and a to-be-created instance 3 in the same application need to be created on corresponding server nodes.

For the to-be-created instance 1, as the available zone 1 and the available zone 2 have not yet been scheduled for instances in the application, available zones may be selected randomly. Now the available zone 1 is selected, and the to-be-created instance 1 is created on the server node 1 in the rack 1 in the available zone 1 according to operations S501 and S530.

For the to-be-created instance 2, as the to-be-created instance 1 in the same application has been provided in the available zone 1, in order to ensure the balanced arrangement, the available zone 2 is selected, and the to-be-created instance 2 is created on the server node 5 in the rack 3 in the available zone 2 according to operations S501 and S530.

For the to-be-created instance 3, the to-be-created instance 3 is created on the server node 3 in the rack 2 in the available zone 1.

The balanced arrangement of instances (i.e., containers) at the three levels of available zone, rack and server node has been achieved above. Since the balanced arrangement of the containers are achieved, even if the available zone 1 or available zone 2 has a fault, such as a massive power outage, the technical solution of embodiments of the present disclosure may still ensure that instances may run.

According to the technical solution of embodiments of the present disclosure, as the available rack list includes the available racks of different available zones, and the available racks in the available rack list and the server nodes in the available racks are sorted according to the priority level, the spare server node located is a server node that meets requirements for the balanced arrangement of the containers. Based on this, a balanced creation of the containers at the three levels of available zone, rack and server node may be achieved, that is, the balanced arrangement of the containers at the three levels of available zone, rack and server node may be achieved. Therefore, the technical problem that it is difficult to achieve the balanced arrangement of the containers by using the related technology is at least partially overcome, hi addition, due to the balanced arrangement of the containers, requirements for a high availability of services across available zones, across racks and across server nodes are met, so that an occurrence of system paralysis may be effectively avoided.

Figure 8:
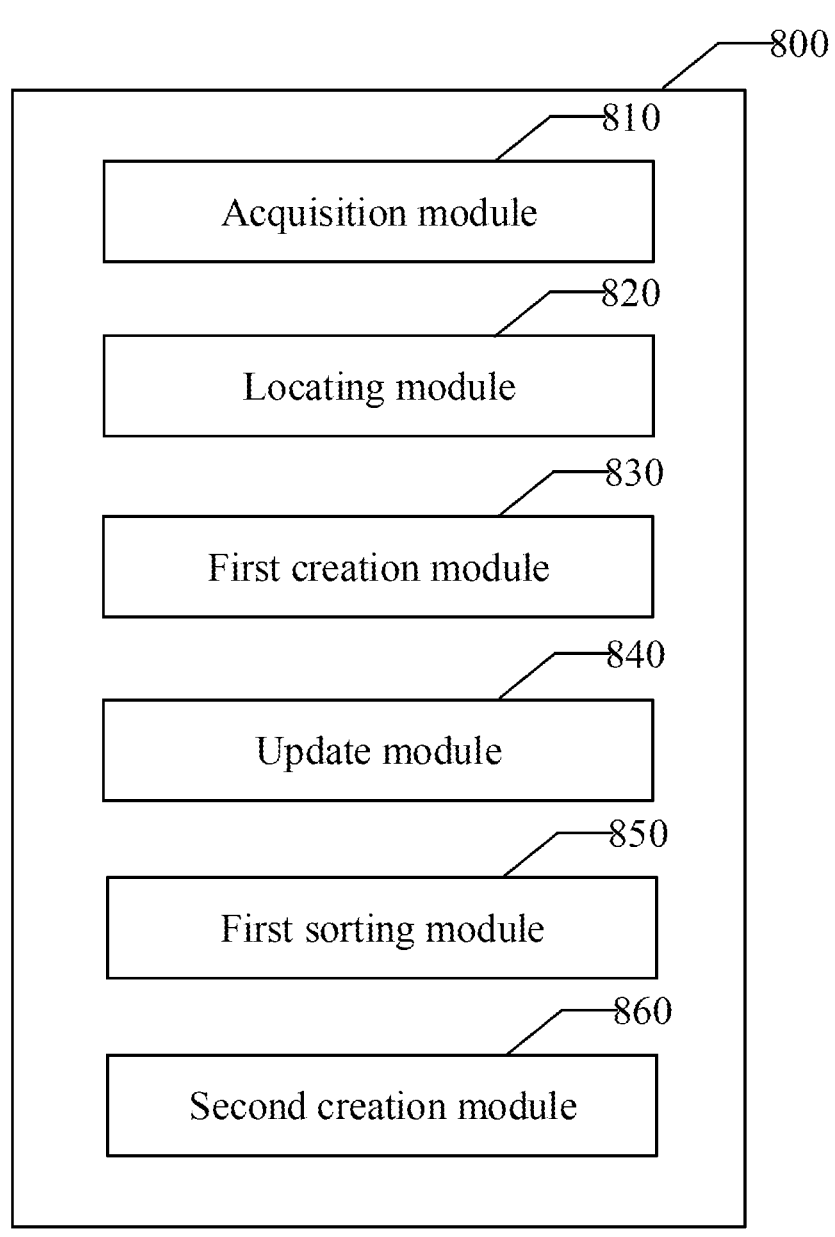
FIG. 8 schematically shows a block diagram of an apparatus of creating a container according to an embodiment of the present disclosure.

FIG. 8 schematically shows a block diagram of an apparatus of creating a container according to an embodiment of the present disclosure.

As shown in FIG. 8, an apparatus 800 of creating a container includes an acquisition module 810, a locating module 820, a first creation module 830, an update module 840, a first sorting module 850, and a second creation module 860.

The acquisition module 810 is used to acquire an available rack list and an available network address list, where the available rack list includes a plurality of available racks of different zones, each available rack includes at least one server node, and the available network address list includes at least one available network address.

The locating module 820 is used to locate a spare server node in the available racks in the available rack list.

The first creation module 830 is used to create, on the spare server node, a current container corresponding to the available network address.

The update module 840 is used to update the available network address list.

The first sorting module 850 is used to re-order the available racks in the available rack list according to resource occupation information of the available racks in the available rack list.

The second creation module 860 is used to create another container according to a spare server node in the re-ordered available racks in the available rack list and the updated available network address list.

In the technical solution of embodiments of the present disclosure, an available rack list and an available network address list are acquired, where the available rack list includes a plurality of available racks of different available zones, each available rack includes at least one server node, and the available network address list includes at least one available network address; a spare server node in the available racks in the available rack list is located; a current container corresponding to the available network address is created on the spare server node; the available network address list is updated; the available racks in the available rack list are re-ordered according to resource occupation information of the available racks in the available rack list; and another container is created according to a spare server node in the re-ordered available racks in the available rack list and the updated available network address list. After each container is created on the spare server node, the available racks in the available rack list may be re-ordered according to the resource occupation information of the available racks in the available rack list, and then a next container may be created according to the spare server node in the re-ordered available racks in the available rack list and the updated available network address list. The spare server nodes come from the available racks of different available zones. Therefore, the balanced arrangement of the containers may be achieved, and the technical problem that it is difficult to achieve the balanced arrangement of the containers by using the related technology may be at least partially overcome. In addition, since the balanced arrangement of the containers is achieved, requirements for a high availability of services across available zones, across racks and across server nodes are met, so that an occurrence of system paralysis may be effectively avoided.

According to embodiments of the present disclosure, the acquiring an available rack list may include: acquiring a total resource of each server node in each rack; acquiring a used resource of each server node, where the used resource is a resource used by a created container; determining the available racks according to the total resource of each server node and the used resource of each server node; and generating the available rack list according to the available racks.

According to embodiments of the present disclosure, the plurality of available racks in the available rack list are sorted according to a priority level.

According to embodiments of the present disclosure, the plurality of available racks in the available rack list are sorted according to a priority level by: acquiring a created container list, where the created container list includes a plurality of created containers, and each created container has a corresponding server node, an application to which the created container belongs, and a group to which the created container belongs; determining a creation quantity information corresponding to each server node, where the creation quantity information includes the number of created containers belonging to the same application and the number of created containers belonging to the same group; and prioritizing the plurality of available racks in the available rack list according to the creation quantity information corresponding to each server node.

According to embodiments of the present disclosure, the locating module 820 may include a first determination sub module, a second determination sub module, a first locating sub module, a second locating sub module and a return sub module.

The first determination sub module is used to determine an available rack having the highest priority level in the available rack list as a current rack.

The second determination sub module is used to determine whether a number of spare server nodes in the current rack is greater than a preset threshold value or not.

The first locating sub module is used to locate, in response to the number of spare server nodes in the current rack being greater than the preset threshold value, a spare server node in the current rack.

The second locating sub module is used to determine, in response to the number of spare server nodes in the current rack being less than or equal to the preset threshold value, an available rack having a next priority level in the available rack list as a current rack.

The return sub module is used to perform the operation of determining whether the number of spare server nodes in the current rack is greater than the preset threshold value, until the spare server node in the current rack is located.

According to embodiments of the present disclosure, the first sorting module 840 may include a first acquisition sub module, a second acquisition sub module, a third acquisition sub module and a sorting sub module.

The first acquisition sub module is used to acquire an application to which the current container belongs and a group to which the current container belongs.

The second acquisition sub module is used to acquire a previous resource occupation information of the current rack in the available rack list.

The third acquisition sub module is used to acquire a previous resource occupation information of another rack in the available rack list.

The third determination sub module is used to determine a current resource occupation information of the current rack according to the application to which the current container belongs, the group to which the current container belongs, and the previous resource occupation information of the current rack.

The first sorting sub module is used to re-order the available racks in the available rack list according to the current resource occupation information of the current rack in the available rack list and the previous resource occupation information of the another rack in the available rack list.

According to embodiments of the present disclosure, the previous resource occupation information of the current rack in the available rack list and the previous resource occupation information of the another rack in the available rack list include the number of containers belonging to the same application, the number of containers belonging to the same group, and a first vacant-seat value, where the first vacant-seat value is a ratio of a total resource of a rack to a resource used by all created containers.

According to embodiments of the present disclosure, the first sorting sub module may include a sorting unit.

The sorting unit is used to re-order the available racks in the available rack list according to a preset rack priority level rule, the current resource occupation information of the current rack in the available rack list and the previous resource occupation information of the another rack in the available rack list, where the preset rack priority level rule includes: the less a number of containers belonging to a same application in an available rack, the higher a priority level of the available rack; in response to the number of containers belonging to the same application being the same, the less a number of containers belonging to a same group in an available rack, the higher a priority level of the available rack; and in response to the number of containers belonging to the same group being the same, the greater a first vacant-seat value of an available rack, the higher a priority level of the available rack.

According to embodiments of the present disclosure, the apparatus 800 of creating the container may further include a second sorting module.

The second sorting module is used to re-order the server nodes in the available racks in the available rack list according to resource occupation information of the server nodes in the available racks in the available rack list.

The second creation module 850 may include a fourth determination sub module and a creation sub module.

The fourth determination sub module is used to determine a new spare server node in the available racks according to the re-ordered available racks in the available rack list and the re-ordered server nodes in the available racks.

The creation sub module is used to create another container according to the new spare server node and the updated available network address list.

According to embodiments of the present disclosure, the resource occupation information of the server nodes in the available racks in the available rack list includes a number of containers belonging to the same application, a number of containers belonging to the same group, and a second vacant-seat value, where the second vacant-seat value is a ratio of a total resource of a server node to a resource used by all created containers.

According to embodiments of the present disclosure, the second sorting module may include a second sorting sub module.

The second sorting sub module is used to re-order the server nodes in the available racks in the available rack list according to a preset server node priority level rule and the resource occupation information of the server nodes in the available racks in the available racks list, where the preset server node priority level rule includes: the less a number of containers belonging to a same application in a server node, the higher a priority level of the server node: in response to the number of containers belonging to the same application being the same, the less a number of containers belonging to a same group in a server node, the higher a priority level of the server node; and in response to the number of containers belonging to the same group being the same, the greater a second vacant-seat value of a server node, the higher a priority level of the server node Any number of modules, sub modules, and units according to embodiments of the present disclosure, or at least some functions of any number of the modules, sub modules and units may be implemented in one module. Any one or more of the modules, the sub modules and the units according to embodiments of the present disclosure may be split into a plurality of modules for implementation. Any one or more of the modules, the sub modules and the units according to embodiments of the present disclosure may be at least partially implemented as hardware circuits, such as Field Programmable Gate Array (FPGA), Programmable Logic Arrays (PLA), System on Chip, System on Substrate, System on Package, and Application Specific Integrated Circuit (ASIC), or may be implemented by hardware or firmware such as any other reasonable way of integrating or encapsulating the circuits, or may be implemented by any one or an appropriate combination of any of the three implementation methods of software, hardware and firmware. Alternatively, one or more of the modules, the sub modules and the units according to embodiments of the present disclosure may be at least partially implemented as a computer program module, and the computer program module, when run, performs corresponding functions.

For example, any number of the acquisition module 810, the locating module 820, the first creation module 830, the update module 840, the first sorting module 850, and the second creation module 860 may be combined in one module/sub module/unit for implementation, or any one of the modules/sub modules/units may be split into a plurality of modules/sub modules/units. Alternatively, at least some functions of one or more of the modules/sub modules/units may be combined with at least some functions of other modules/sub modules/units and implemented in one module/sub module/unit. According to embodiments of the present disclosure, at least one of the acquisition module 810, the locating module 820, the first creation module 830, the update module 840, the first sorting module 850 and the second creation module 860 may be at least partially implemented as a hardware circuit, such as Field Programmable Gate Array (FPGA), Programmable Logic Arrays (PLA), System on Chip, System on Substrate, System on Package, and Application Specific Integrated Circuit (ASIC), or may be implemented by hardware or firmware such as any other reasonable way of integrating or encapsulating the circuits, or may be implemented by any one or an appropriate combination of any of the three implementation methods of software, hardware and firmware. Alternatively, at least one of the acquisition module 810, the locating module 820, the first creation module 830, the update module 840, the first sorting module 850, and the second creation module 860 may be at least partially implemented as a computer program module, and the computer program module, when run, performs corresponding functions.

It should be noted that the apparatus of creating the container according to embodiments of the present disclosure corresponds to the method of creating the container according to embodiments of the present disclosure. For the descriptions of the apparatus of creating the container, please refer to the method of creating the container, which will not be repeated here.

Figure 9:
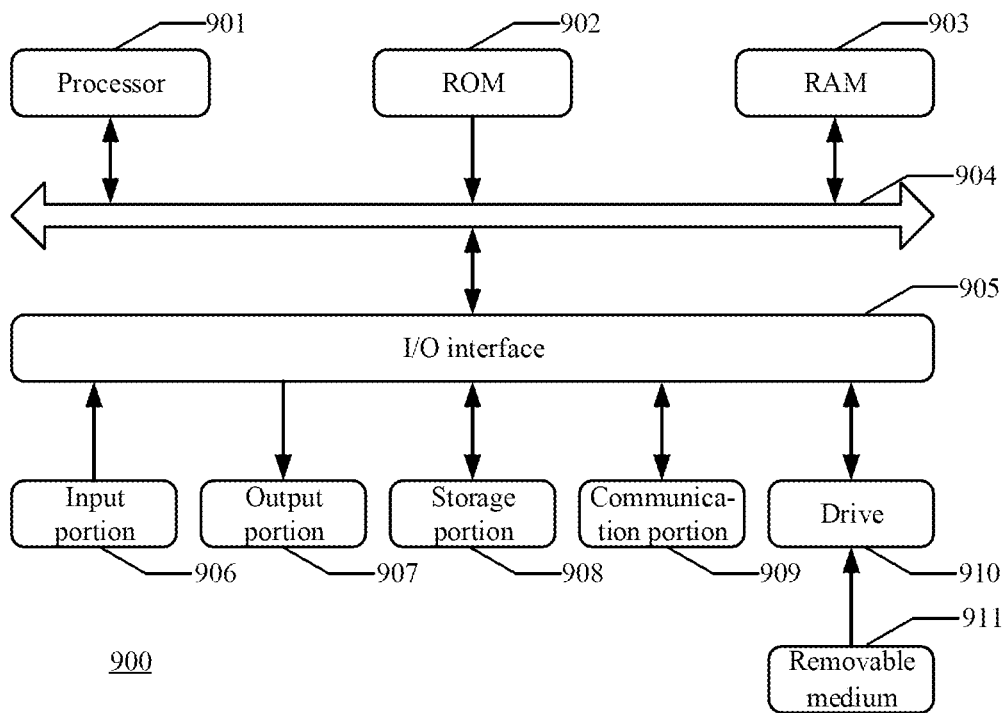
FIG. 9 schematically shows a block diagram of an electronic device for implementing a method of creating a container according to an embodiment of the present disclosure.

FIG. 9 schematically shows a block diagram of an electronic device adapted to implement the method as described above according to an embodiment of the present disclosure. The electronic device shown in FIG. 9 is only an example, and is not intended to limit functions and scope of use of embodiments of the present disclosure.

As shown in FIG. 9, an electronic device 900 according to embodiments of the present disclosure includes a processor 901, which may perform various appropriate actions and processes according to a program stored in a Read-only Memory (ROM) 902 or a program loaded from a storage portion 908 into a Random Access Memory (RAM) 903. The processor 901 may include, for example, a general-purpose microprocessor (such as a CPU), an instruction set processor and/or a related chipset and/or a dedicated microprocessor (such as an Application Specific Integrated. Circuit (ASIC)), etc. The processor 901 may also include an on-board memory for caching purposes. The processor 901 may include a single processing unit or a plurality of processing units configured to perform different actions of a method flow according to embodiments of the present disclosure.

In the RAM 903, various programs and data required for an operation of a system 900 are stored. The processor 901, the ROM 902 and the RAM 903 are connected to each other through a bus 904. The processor 901 performs various operations of the method flow according to embodiments of the present disclosure by executing programs in the ROM 902 and/or the RAM 903. It should be noted that the program may also be stored in one or more memories other than the ROM 902 and the RAM 903. The processor 901 may also perform various operations of the method flow according to embodiments of the present disclosure by executing programs stored in the one or more memories.

According to embodiments of the present disclosure, the electronic device 900 may also include an input/output (I/O) interface 905, and the input/output (I/O) interface 905 is also connected to the bus 904. The system 900 may also include one or more of the following components connected to the I/O interface 905: an input portion 906 including a keyboard, a mouse, etc.; an output portion 907 including a cathode ray tube (CRT), a Liquid Crystal Display (LCD), etc., and a loudspeaker, etc.; a storage portion 908 including a hard disk, etc.; and a communication portion 909 including a network interface card such as a LAN card, a modem, etc. The communication portion 909 performs a communication processing via a network such as the Internet. A drive 910 is also connected to the I/O interface 905 as required. A removable medium 911, such as a magnetic disk, an optical disk, a magneto-optical disk, a semiconductor memory, etc., is installed on the drive 910 as required, so that a computer program read therefrom may be installed into the storage portion 908 as required.

According to embodiments of the present disclosure, the method flow according to embodiments of the present disclosure may be implemented as a computer software program. For example, embodiments of the present disclosure include a computer program product, which includes a computer program loaded on a computer-readable storage medium, and the computer program contains s program code configured to perform a method shown in a flowchart. In the embodiment, the computer program may be downloaded and installed from the network through the communication portion 909, and/or installed from the removable medium. When the computer program is executed by the processor 901, the above-mentioned functions defined in the system according to embodiments of the present disclosure are executed. According to embodiments of the present disclosure, the system, device, apparatus, module, unit, etc. described above may be implemented by the computer program module.

The present disclosure further provides a computer-readable storage medium, and the computer-readable storage medium may be included in the device/apparatus/system described in the above-mentioned embodiment; the computer-readable storage medium may also exist alone without being assembled into the device/apparatus/system. The above-mentioned computer-readable storage medium carries one or more programs. The one or more programs, when executed, implement the method according to embodiments of the present disclosure.

According to an embodiment of the present disclosure, the computer-readable storage medium may be a nonvolatile computer-readable storage medium. For example, the computer-readable storage medium may include but not limited to: a portable computer disk, a hard disk, a Random Access Memory (RAM), a Read-only Memory (ROM), an Erasable Programmable Read Only Memory (EPROM) or a flash memory, a Computer Disc Read-Only Memory (CD-ROM), an optical storage device, a magnetic storage device, or any appropriate combination thereof. In the present disclosure, the computer-readable storage medium may be any tangible medium containing or storing a program, and the program may be used by or in combination with an instruction execution system, apparatus, or device.

For example, according to embodiments of the present disclosure, the computer-readable storage medium may include the ROM 902 and the RAM 903 described above and/or one or more memories other than the ROM 902 and/or the RAM 903.

The flowchart and block diagram in the accompanying drawings illustrate possible architectures, functions and operations of the systems, methods and computer program products according to various embodiments of the present disclosure. In this regard, each block in the flowchart or block diagram may represent a module, a program segment, or a portion of a code, and the module, the program segment, or the portion of the code contains one or more executable instructions for implementing a specified logical function. It should also be noted that in some alternative implementations, the functions marked in the block may also occur in a different order from those marked in the accompanying drawings. For example, two consecutive blocks may actually be performed substantially in parallel, or may sometimes be performed in a reverse order, depending on the functions involved. It should also be noted that each block in the block diagram or flowchart, and a combination of the blocks in the block diagram or flowchart may be implemented by a dedicated hardware-based system that performs a specified function or operation, or by a combination of a dedicated hardware and computer instructions. Those skilled in the art may understand that the features recited in various embodiments and/or claims of the present disclosure may be combined and/or incorporated in a variety of ways, even if the combinations or incorporations are not explicitly recited in the present disclosure. In particular, without departing from the spirit and teaching of the present disclosure, the features recorded in various embodiments and/or claims of the present disclosure may be combined and/or incorporated in a variety of ways. All the combinations and/or incoiporations fall within the scope of the present disclosure.

Embodiments of the present disclosure have been described above. However, the embodiments are for illustrative purposes only, and are not intended to limit the scope of the present disclosure. Although various embodiments have been described respectively above, this does not mean that the measures in various embodiments may not be used together advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of creating a container, comprising:

acquiring an available rack list and an available network address list, wherein the available rack list comprises a plurality of available racks of different available zones, each available rack comprises at least one server node, and the available network address list comprises at least one available network address, and each of the at least one available network address refers to a network address that is configured to set a Pod but has not been used yet, and the Pod is a smallest deployable working unit that is created and managed in Kubernetes;

locating a spare server node in the plurality of available racks in the available rack list, wherein the spare server node refers to a server node with a spare resource, and the spare resource refers to a resource used for setting at least one container;

creating, on the spare server node, a current Pod corresponding to one of the at least one available network address, and creating a current container in the current Pod, wherein the current container has an application to which the current container belongs and a group to which the current container belongs, the application to which the current container belongs, refers to an independent functional module in an independent service module on a product line, and the group to which the current container belongs, refers to an independent module for solving problems of different scenarios in the application to which the current container belongs, and is configured to manage an environment variable and an external configuration required for a container operation, and wherein the application to which the current container belongs, comprises at least one group;

updating the available network address list;

re-ordering the plurality of available racks in the available rack list according to resource occupation information of each of the plurality of available racks in the available rack list and a preset rack priority level rule, wherein the resource occupation information of each of the plurality of available racks comprises a number of containers belonging to a same application, a number of containers belonging to a same group, and a first vacant-seat value, the first vacant-seat value is a ratio of a total number of resources of each of the plurality of available racks to a number of resources used by all created containers; and creating another container according to a new spare server node in the plurality of re-ordered available racks in the available rack list and the updated available network address list, wherein the method further comprises:

re-ordering server nodes in the plurality of available racks in the available rack list according to resource occupation information of the server nodes in the plurality of available racks in the available rack list, wherein the creation of the other container according to the new spare server node in the plurality of re-ordered available racks in the available rack list and the updated available network address list comprises:

determining the new spare server node in the plurality of available racks according to the plurality of re-ordered available racks in the available rack list and the re-ordered server nodes in the plurality of available racks; and creating the other container according to the new spare server node and the updated available network address list, wherein the method is configured to balance distribution of the created containers across the different available zones, the plurality of available racks, and the server nodes to improve fault tolerance of container clusters.

2. The method according to claim 1, wherein the acquisition of the available rack list comprises:

acquiring a total resource of each server node in each rack;

acquiring a used resource of each server node, wherein the used resource of each server node is a resource used by a created container of the created containers;

determining the plurality of available racks according to the total resource of each server node and the used resource of each server node; and generating the available rack list according to the plurality of available racks.

3. The method according to claim 2, wherein the plurality of available racks in the available rack list are sorted according to a priority level prior to the re-ordering of the plurality of available racks.

4. The method according to claim 3, wherein the plurality of available racks in the available rack list are sorted according to the priority level by:

acquiring a created container list, wherein the created container list comprises the created containers, and each respective created container of the created containers has a corresponding server node, an application to which the respective created container belongs, and a group to which the respective created container belongs;

determining a creation quantity information corresponding to each server node of the server nodes, wherein the creation quantity information comprises a number of the created containers belonging to a same application and a number of the created containers belonging to a same group; and prioritizing the plurality of available racks in the available rack list according to the creation quantity information corresponding to each server node of the server nodes.

5. The method according to claim 3, wherein the locating of the spare server node in the plurality of available racks in the available rack list comprises:

determining an available rack having a highest priority level in the available rack list as a current rack;

determining whether a number of spare server nodes in the current rack is greater than a preset threshold value or not;

in response to the number of spare server nodes in the current rack being greater than the preset threshold value, locating the spare server node in the current rack;

in response to the number of spare server nodes in the current rack being less than or equal to the preset threshold value, determining an available rack having a next priority level in the available rack list as the current rack; and returning to perform an operation of determining whether a number of spare server nodes in the current rack is greater than the preset threshold value or not, until the spare server node in the current rack is located.

6. The method according to claim 5, wherein the re-ordering of the plurality of available racks in the available rack list according to the resource occupation information of the plurality of available racks in the available rack list comprises:

acquiring the application to which the current container belongs and the group to which the current container belongs;

acquiring a previous resource occupation information of the current rack in the available rack list;

acquiring a previous resource occupation information of another rack in the available rack list;

determining a current resource occupation information of the current rack according to the application to which the current container belongs, the group to which the current container belongs, and the previous resource occupation information of the current rack; and re-ordering the plurality of available racks in the available rack list according to the current resource occupation information of the current rack in the available rack list and the previous resource occupation information of the other rack in the available rack list.

7. The method according to claim 6, wherein the re-ordering of the plurality of available racks in the available rack list according to the current resource occupation information of the current rack in the available rack list and the previous resource occupation information of the other rack in the available rack list comprises:

re-ordering the plurality of available racks in the available rack list according to the preset rack priority level rule, the current resource occupation information of the current rack in the available rack list and the previous resource occupation information of the other rack in the available rack list.

8. The method according to claim 1, wherein the resource occupation information of the server nodes in the plurality of available racks in the available rack list comprises the number of containers belonging to the same application, the number of containers belonging to the same group, and a second vacant-seat value, wherein the second vacant-seat value is a ratio of a total resource of a server node of the server nodes to a resource used by all the created containers.

9. The method according to claim 8, wherein the re-ordering server nodes in the plurality of available racks in the available rack list according to the resource occupation information of the server nodes in the plurality of available racks in the available rack list comprises:

re-ordering the server nodes in the plurality of available racks in the available rack list according to a preset server node priority level rule and the resource occupation information of the server nodes in the plurality of available racks in the available rack list.

10. An electronic device, comprising:

one or more processors; and a memory configured to store one or more programs, wherein the one or more programs, when executed by the one or more processors, is or are configured to cause the one or more processors to at least:

acquire an available rack list and an available network address list, wherein the available rack list comprises a plurality of available racks of different available zones, each available rack comprises at least one server node, and the available network address list comprises at least one available network address, and each of the at least one available network address refers to a network address that is configured to set a Pod but has not been used yet, and the Pod is a smallest deployable working unit that is created and managed in Kubernetes;

locate a spare server node in the plurality of available racks in the available rack list, wherein the spare server node refers to a server node with a spare resource, and the spare resource refers to a resource used for setting at least one container;

create, on the spare server node, a current Pod corresponding to one of the at least one available network address, and create a current container in the current Pod, wherein the current container has an application to which the current container belongs and a group to which the current container belongs, the application to which the current container belongs, refers to an independent functional module in an independent service module on a product line, and the group to which the current container belongs, refers to an independent module for solving problems of different scenarios in the application to which the current container belongs, and is configured to manage an environment variable and an external configuration required for a container operation, and wherein the application to which the current container belongs, comprises at least one group;

update the available network address list;

re-order the plurality of available racks in the available rack list according to resource occupation information of each of the plurality of available racks in the available rack list and a preset rack priority level rule, wherein the resource occupation information of each of the plurality of available racks comprises a number of containers belonging to a same application, a number of containers belonging to a same group, and a first vacant-seat value, the first vacant-seat value is a ratio of a total number of resources of each of the plurality of available racks to a number of resources used by all created containers; and create another container according to a new spare server node in the plurality of re-ordered available racks in the available rack list and the updated available network address list, wherein the one or more programs is or are further configured to cause the one or more processors to at least:

re-order server nodes in the plurality of available racks in the available rack list according to resource occupation information of the server nodes in the plurality of available racks in the available rack list, wherein the one or more programs is or are further configured to cause the one or more processors to at least:

determine the new spare server node in the plurality of available racks according to the plurality of re-ordered available racks in the available rack list and the re-ordered server nodes in the plurality of available racks; and balance distribution of the created containers across the different available zones, the plurality of available racks, and the server nodes to improve fault tolerance of container clusters.

11. A non-transitory computer-readable storage medium having executable instructions therein, wherein the instructions, when executed by a processor, are configured to cause the processor to at least:

acquire an available rack list and an available network address list, wherein the available rack list comprises a plurality of available racks of different available zones, each available rack comprises at least one server node, and the available network address list comprises at least one available network address, and each of the at least one available network address refers to a network address that is configured to set a Pod but has not been used yet, and the Pod is a smallest deployable working unit that is created and managed in Kubernetes;

locate a spare server node in the plurality of available racks in the available rack list, wherein the spare server node refers to a server node with a spare resource, and the spare resource refers to a resource used for setting at least one container;

create, on the spare server node, a current Pod corresponding to one of the at least one available network address, and create a current container in the current Pod, wherein the current container has an application to which the current container belongs and a group to which the current container belongs, the application refers to an independent functional module in an independent service module on a product line, and the group refers to an independent module for solving problems of different scenarios in the application and is configured to manage an environment variable and an external configuration required for a container operation, and wherein the application comprises at least one group;

update the available network address list;

re-order the plurality of available racks in the available rack list according to resource occupation information of each of the plurality of available racks in the available rack list and a preset rack priority level rule, wherein the resource occupation information of each of the plurality of available racks comprises a number of containers belonging to a same application, a number of containers belonging to a same group, and a first vacant-seat value, the first vacant-seat value is a ratio of a total number of resources of each of the plurality of available racks to a number of resources used by all created containers; and create another container according to a new spare server node in the plurality of re-ordered available racks in the available rack list and the updated available network address list, wherein the instructions are further configured to cause the processor to at least:

re-order server nodes in the plurality of available racks in the available rack list according to resource occupation information of the server nodes in the plurality of available racks in the available rack list, wherein the instructions are further configured to cause the processor to at least:

determine the new spare server node in the plurality of available racks according to the plurality of re-ordered available racks in the available rack list and the re-ordered server nodes in the plurality of available racks; and balance distribution of the created containers across the different available zones, the plurality of available racks, and the server nodes to improve resource utilization and fault tolerance of container clusters.

12. The electronic device according to claim 10, wherein the one or more programs is or are further configured to cause the one or more processors to at least:

acquire a total resource of each server node in each rack;

acquire a used resource of each server node, wherein the used resource of each server node is a resource used by a created container of the created containers;

determine the plurality of available racks according to the total resource of each server node and the used resource of each server node; and generate the available rack list according to the plurality of available racks.

13. The electronic device according to claim 12, wherein the plurality of available racks in the available rack list are sorted according to a priority level prior to the re-ordering of the plurality of available racks.

14. The electronic device according to claim 13, wherein the plurality of available racks in the available rack list are sorted according to the priority level by:

acquiring a created container list, wherein the created container list comprises the created containers, and each respective created container of the created containers has a corresponding server node, an application to which the respective created container belongs, and a group to which the respective created container belongs;

determining a creation quantity information corresponding to each server node of the server nodes, wherein the creation quantity information comprises a number of the created containers belonging to a same application and a number of the created containers belonging to a same group; and prioritizing the plurality of available racks in the available rack list according to the creation quantity information corresponding to each server node of the server nodes.

15. The electronic device according to claim 13, wherein the one or more programs is or are further configured to cause the one or more processors to at least:

determine an available rack having a highest priority level in the available rack list as a current rack;

determine whether a number of spare server nodes in the current rack is greater than a preset threshold value or not;

in response to the number of spare server nodes in the current rack being greater than the preset threshold value, locate the spare server node in the current rack;

in response to the number of spare server nodes in the current rack being less than or equal to the preset threshold value, determine an available rack having a next priority level in the available rack list as the current rack; and return to perform an operation of determining whether a number of spare server nodes in the current rack is greater than the preset threshold value or not, until the spare server node in the current rack is located.

16. The electronic device according to claim 15, wherein the one or more programs is or are further configured to cause the one or more processors to at least:

acquire the application to which the current container belongs and the group to which the current container belongs;

acquire a previous resource occupation information of the current rack in the available rack list;

acquire a previous resource occupation information of another rack in the available rack list;

determine a current resource occupation information of the current rack according to the application to which the current container belongs, the group to which the current container belongs, and the previous resource occupation information of the current rack; and re-order the plurality of available racks in the available rack list according to the current resource occupation information of the current rack in the available rack list and the previous resource occupation information of the other rack in the available rack list.

17. The electronic device according to claim 16, wherein the one or more programs is or are further configured to cause the one or more processors to at least:

re-order the plurality of available racks in the available rack list according to the preset rack priority level rule, the current resource occupation information of the current rack in the available rack list and the previous resource occupation information of the other rack in the available rack list.

* * * * *